(12) United States Patent
Hashimoto et al.

(10) Patent No.: US 11,485,532 B2
(45) Date of Patent: Nov. 1, 2022

(54) BOX PACKING DEVICE

(71) Applicant: Kawasaki Jukogyo Kabushiki Kaisha, Kobe (JP)

(72) Inventors: Takeshi Hashimoto, Kakogawa (JP); Kazunori Hirata, Yao (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 70 days.

(21) Appl. No.: 17/105,661

(22) Filed: Nov. 27, 2020

(65) Prior Publication Data

US 2021/0078742 A1 Mar. 18, 2021

Related U.S. Application Data

(63) Continuation of application No. PCT/JP2019/021552, filed on May 30, 2019.

(30) Foreign Application Priority Data

May 30, 2018 (JP) .............................. JP2018-103978

(51) Int. Cl.
*B65B 43/30* (2006.01)
*B25J 9/04* (2006.01)
(Continued)

(52) U.S. Cl.
CPC ............... *B65B 43/30* (2013.01); *B25J 9/043* (2013.01); *B25J 9/1669* (2013.01); *B65B 5/024* (2013.01);
(Continued)

(58) Field of Classification Search
CPC .......... B65B 5/105; B65B 5/08; B65B 5/024; B65B 43/39; B65B 43/305; B65B 43/30; B65B 2220/16; B65B 35/18; B65B 35/16; B25J 9/0087; B25J 9/06; B25J 9/043; B25J 9/1669; B25J 15/0066; B25J 15/00
See application file for complete search history.

(56) References Cited

U.S. PATENT DOCUMENTS

| | | | |
|---|---|---|---|
| 2013/0036716 A1* | 2/2013 | Tsutsumi ................. | B65B 7/20 53/564 |
| 2016/0347487 A1 | 12/2016 | Minamino et al. | |
| 2020/0039090 A1 | 2/2020 | Bando et al. | |

FOREIGN PATENT DOCUMENTS

| | | | | |
|---|---|---|---|---|
| CN | 104271474 | * | 1/2015 | .............. B25J 18/00 |
| JP | 2005-52921 A | | 3/2005 | |

(Continued)

*Primary Examiner* — Thomas M Wittenschlaeger
(74) *Attorney, Agent, or Firm* — Xsensus LLP

(57) ABSTRACT

A box packing device includes a first arm, a first hand, and a controller. The first hand includes a hand base, a gripping mechanism at the hand base and including a gripper to grip an upper-end of a flap of a large box, and a holding mechanism at the hand base and including a holder to hold an inner box. The controller controls the operation of the first arm and the first hand so as to perform a developing operation in which the gripping part of the gripping mechanism moves in a horizontal plane so as to develop the large box while gripping the upper-end part of the flap part of the large box in a folded state, and an accommodating operation in which the holder of the holding mechanism accommodates the inner box into the developed large box while holding the inner box.

13 Claims, 16 Drawing Sheets

(51) Int. Cl.
*B25J 9/16* (2006.01)
*B65B 5/08* (2006.01)
*B65B 35/16* (2006.01)
*B65B 5/02* (2006.01)
*B25J 15/00* (2006.01)

(52) U.S. Cl.
CPC ............... *B65B 5/08* (2013.01); *B65B 35/16* (2013.01); *B25J 15/00* (2013.01)

(56) References Cited

FOREIGN PATENT DOCUMENTS

| | | | |
|---|---|---|---|
| JP | 2013-212580 | A | 10/2013 |
| JP | 2018-1736 | A | 1/2018 |
| JP | 2018-58184 | A | 4/2018 |
| WO | 2014/125627 | A1 | 8/2014 |
| WO | 2015/029143 | A1 | 3/2015 |
| WO | 2015/129388 | A1 | 9/2015 |

* cited by examiner

BOX PACKING DEVICE

CROSS-REFERENCES TO RELATED APPLICATIONS

The present application is a bypass continuation of PCT filing PCT/JP2019/021552, filed May 30, 2019, which claims priority to JP 2018-103978, filed May 30, 2018, both of which are incorporated herein by reference.

TECHNICAL FIELD

The present disclosure relates to a box packing device for placing, into a large box for packing, a plurality of inner boxes accommodating objects to be packed, respectively.

BACKGROUND ART

A manufacturing line for products may include processes to accommodate a given number of products (objects to be packed) in an inner box, and then, place a plurality of inner boxes into a larger box so as to pack the products. In the existing manufacturing line, in many cases, such processes are performed by workers developing and assembling the large boxes which are in a folded state, and then, placing into the developed large boxes.

DESCRIPTION OF THE DISCLOSURE

Summary of the Disclosure

A box packing device according to one aspect of the present disclosure is a box packing device for placing, into a large box for packing, a plurality of inner boxes accommodating objects to be packed, respectively. The device includes a first arm having a plurality of joint axes, a first hand provided to a tip-end part of the first arm, and a controller configured to control operation of the first arm and the first hand. The first hand includes a hand base part, a gripping mechanism provided to the hand base part and including a gripping part configured to grip an upper-end part of a flap part of the large box, and a holding mechanism provided to the hand base part and including a holding part configured to hold the inner box. The controller controls the operation of the first arm and the first hand so as to perform a developing operation in which the gripping part of the gripping mechanism moves in a horizontal plane so as to develop the large box while the gripping part grips the upper-end part of the flap part of the large box in a folded state, and an accommodating operation in which the holding part of the holding mechanism accommodates the inner box into the developed large box while the holding part holds the inner box. The first hand is configured so that the gripping part of the gripping mechanism and the holding part of the holding mechanism are located to be separated from each other in a plan view, and separated from each other in a vertical direction.

The above-described purpose, other purposes, features, and advantages of the present disclosure will become clear from detailed description of preferred embodiments described below with reference to the accompanying drawings.

MODES FOR CARRYING OUT THE DISCLOSURE

Figure 1:
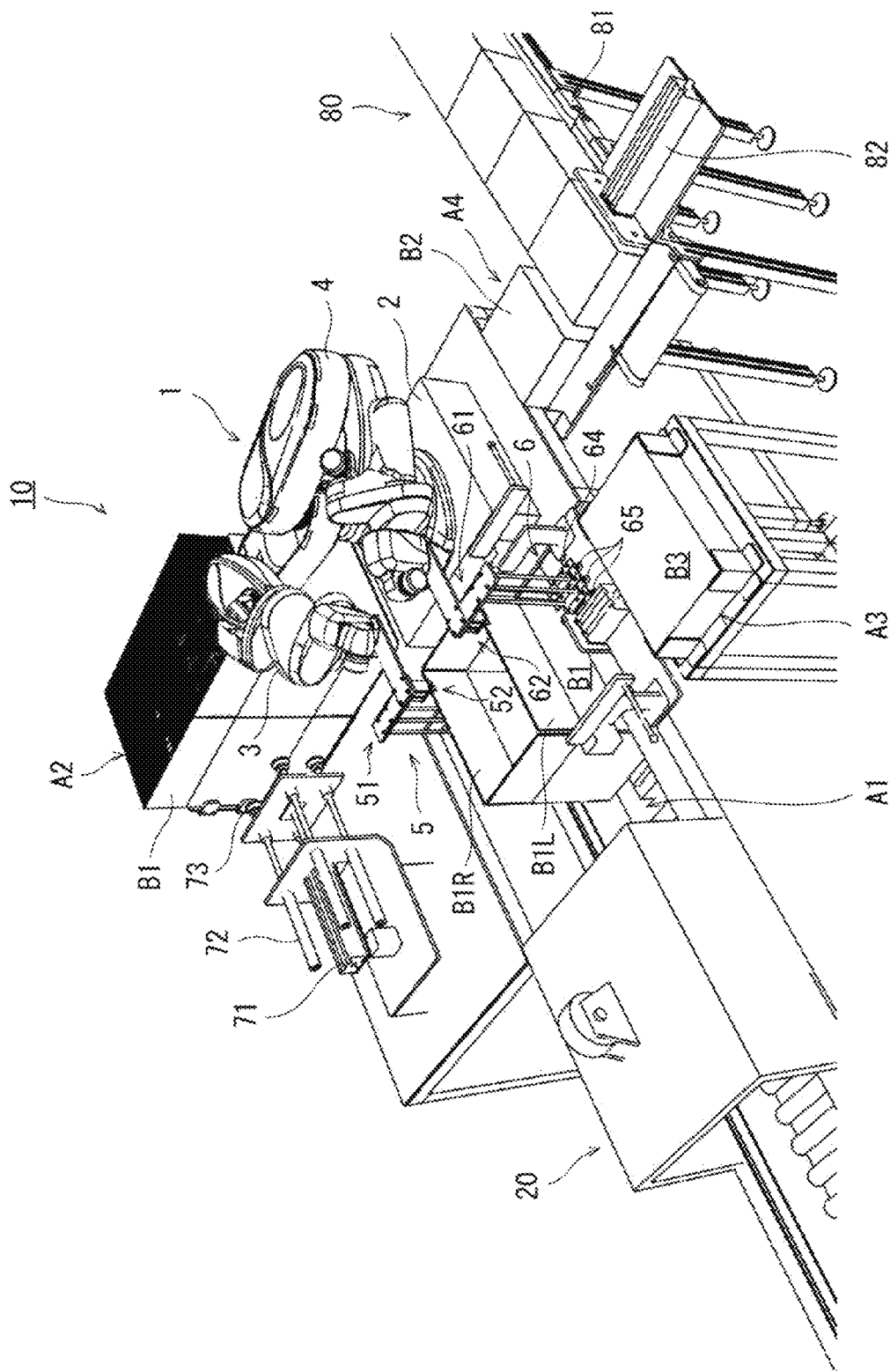
FIG. 1 is a perspective view illustrating one example of a box packing device according to Embodiment 1 of the present disclosure.

Hereinafter, embodiments of the present disclosure are described with reference to the drawings. Note that the same reference characters are given to the same or corresponding components throughout the drawings in order to omit redundant description.

Embodiment 1

Figure 2:
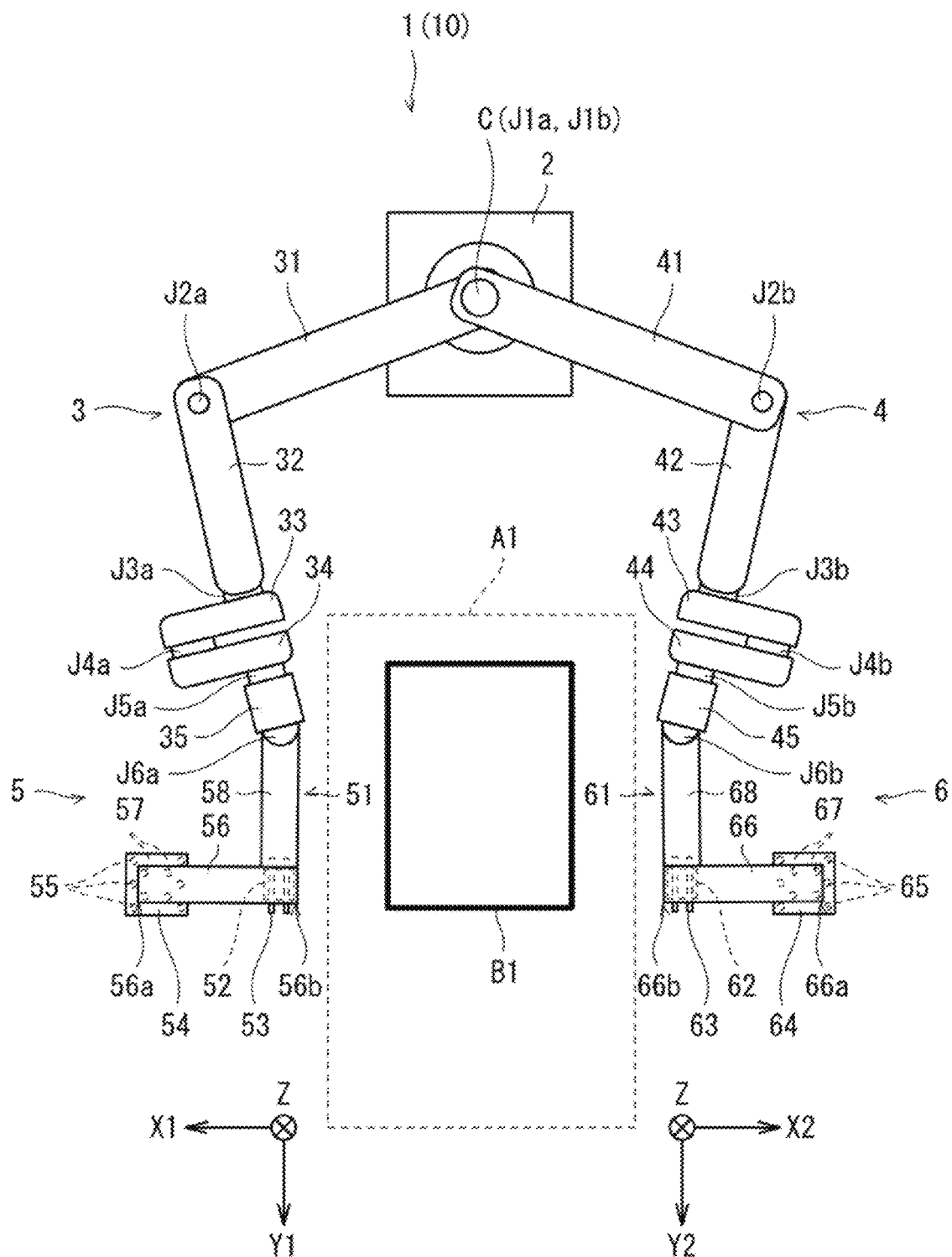
FIG. 2 is a plan view schematically illustrating a substantial configuration of the box packing device illustrated in FIG. 1.
Figure 3:
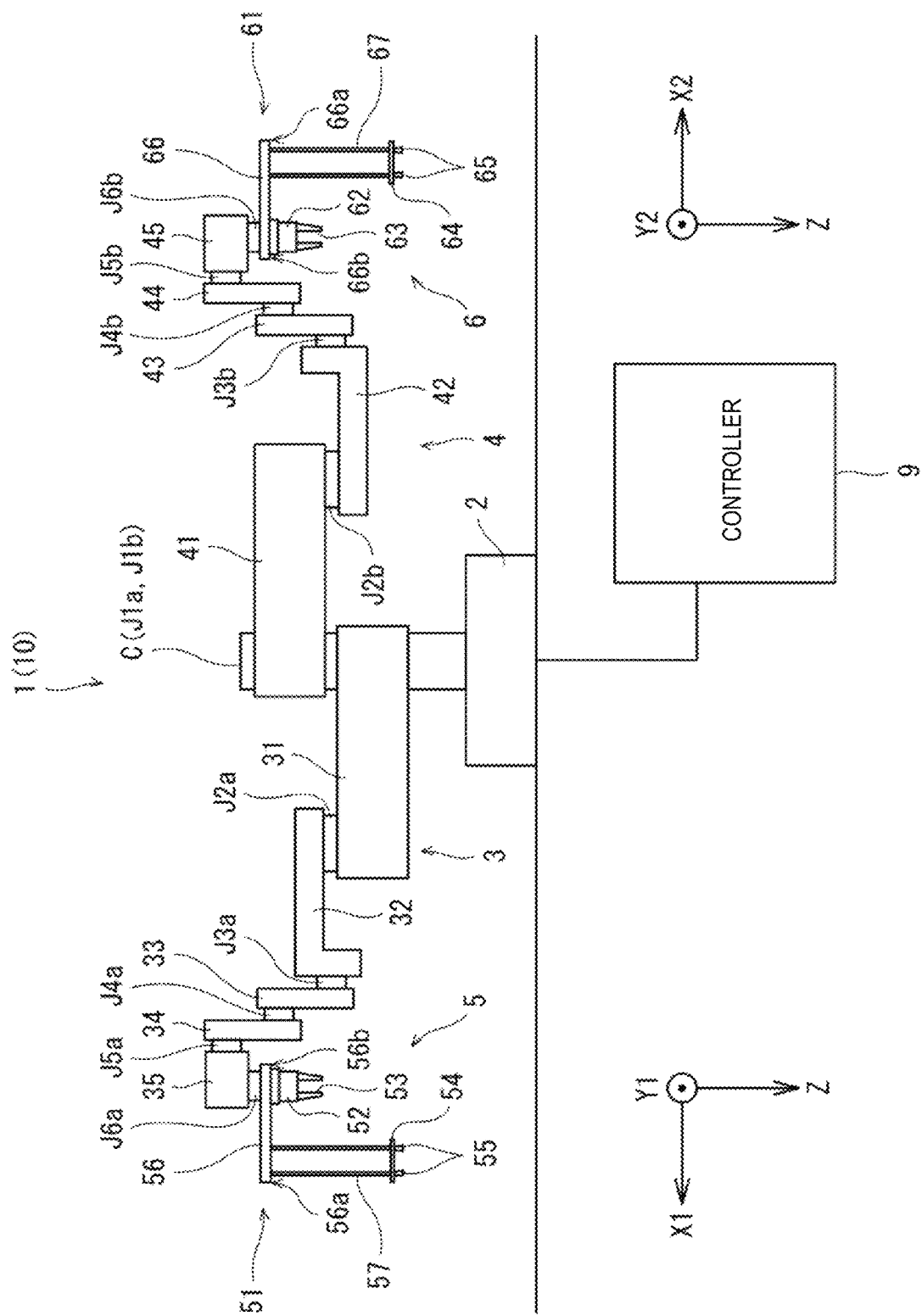
FIG. 3 is a front view of the box packing device illustrated in FIG. 2.

FIG. 1 is a perspective view illustrating one example of a box packing device according to Embodiment 1 of the present disclosure. FIG. 2 is a plan view schematically illustrating a substantial configuration of the box packing device illustrated in FIG. 1. FIG. 3 is a front view of the box packing device illustrated in FIG. 2. Since FIGS. 2 and 3 schematically illustrate the configuration of FIG. 1, details of the shapes, etc. are different from the configuration of FIG. 1.

As illustrated in FIGS. 1 to 3, a box packing device 10 of this embodiment includes a dual-arm robot 1 provided with two arms (a first arm 3 and a second arm 4) on a pedestal 2. The first arm 3 is provided with a first hand 5 at a tip-end part thereof, and includes a plurality of joint axes (in this embodiment, six joint axes J1a-J6a) between the pedestal 2 and the first hand 5. That is, the first arm 3 includes a plurality of members (in this embodiment, a first member 31 to a fifth member 35 from the joint axis J1a side) each connecting two adjacent joint axes.

Similarly, the second arm 4 is provided with a second hand 6 at a tip-end part thereof, and includes at least one joint axis (in this embodiment, six joint axes J1b-J6b) between the pedestal 2 and the second hand 6. That is, the second arm 4 includes a plurality of members (in this embodiment, a first member 41 to a fifth member 45 from the joint axis J1b side) each connecting two adjacent joint axes.

The joint axes J1a, J2a, and J6a of the first arm 3 are disposed perpendicularly to the pedestal 2, and the joint axes J3a, J4a, and J5a are disposed horizontally to the pedestal 2 (i.e., perpendicularly to the joint axes J1a, J2a, and J6a). Similarly, the joint axes J1b, J2b, and J6b of the second arm 4 are disposed perpendicularly to the pedestal 2, and the joint axes J3b, J4b, and J5b are disposed horizontally to the pedestal 2 (i.e., perpendicularly to the joint axes J1b, J2b, and J6b). The third member 33 of the first arm 3 between the joint axis J3a and the joint axis J4a, and the fourth member 34 of the first arm 3 between the joint axis J4a and the joint axis J5a have substantially the same length (inter-joint-axes distance).

Therefore, by changing an angle between the third member 33 and the fourth member 34 while the joint axis J3a and the joint axis J5a are disposed coaxially in the plan view, the position of a tip-end part of the first arm 3 (the first hand 5) can be changed vertically without the position being changed horizontally. The third member 43 and the fourth member 44 of the second arm 4 are configured similarly to the first arm 3.

Moreover, by the vertical joint axes J1a, J2a, J6a, J1b, J2b, and J6b rotating in a state the horizontal joint axes J3a-J5a, and J3b-J5b do not rotate, the tip-end parts of the arms 3 and 4 (the first hand 5 and the second hand 6) move in a plane parallel to the horizontal plane.

The robot 1 in this embodiment is configured as a coaxial dual-arm robot in which the joint axis J1a and the joint axis J1b are disposed coaxially (configured as a rotation axis C). The first arm 3 and the second arm 4 are rotatable about the rotation axis C independently from each other with respect to the pedestal 2. Since base parts of the two arms 3 and 4 are coaxially disposed, the origin of a robot coordinate system can be set to the coaxial position. Therefore, a teaching for the two arms 3 and 4 can be performed similarly, and the two arms 3 and 4 can be controlled highly accurately without time delay.

As illustrated in FIG. 1, the box packing device 10 of this embodiment is provided with, in front of the pedestal 2, a packing area A1 for performing a developing operation of a large box (a first box) B1 and an accommodating operation of an inner box (a second box) B2 (these operations will be described later). In front of the packing area A1, a large-box transfer device 20 is provided, which is a device for sealing an upper-end part of the large box B1 in which the inner box B2 is packed, and transferring the large box B1.

On one side of the pedestal 2 in a left-and-right direction (right side when seen from the robot 1 facing the packing area A1), a large-box placing area A2 is provided, where a plurality of folded large boxes B1 are stocked. The large box B1 is a casing which can be folded, such as a cardboard box. On the one side of the packing area A1 in the left-and-right direction, a large-box setting device is disposed, which places the large box B1 folded and placed in the large-box placing area A2, in a right-end part of the packing area A1. The large-box setting device is configured so that a body part 71 thereof is rotatable about a vertical axis. The body part 71 is provided with an expansion-and-contraction mechanism 72 capable of expanding and contracting the body part 71 in a direction orthogonal to the vertical axis, and a suction mechanism 73 provided at a tip-end part of the expansion-and-contraction mechanism 72.

Moreover, on the other side of the pedestal 2 in the left-and-right direction (left side when seen from the robot 1 facing the packing area A1), an inner-box transfer device 80 for transferring the plurality of inner boxes B2 is provided. The inner-box transfer device 80 is provided with a transferring part 81 such as a conveyor roller and a conveyor belt, which transfers the inner boxes B2, and a moving mechanism 82 at an end part of the transferring part 81, which moves the inner boxes B2 to an inner-box placing area A4. On the other side of the packing area A1, an internal-plate placing area A3 is provided, where an internal plate B3 of the large box B1 is placed.

The box packing device 10 is provided with a controller 9 which controls the first arm 3 and the second arm 4. The controller 9 is provided with, for example, a CPU such as a microcontroller, and a memory which stores a control program. The controller 9 servo controls servomotors (not illustrated) which rotary drive respective joint axes J1a-J6a and J1b-J6b of the robot 1 so as to move the first hand 5 and the second hand 6 to arbitrary positions along arbitrary paths. The controller 9 may control the operations of the large-box setting device and the transfer devices 20 and 80.

The first hand 5 is provided with a hand base part 51, a gripping mechanism 52, and a holding mechanism 54. The gripping mechanism 52 is provided to the hand base part 51, and has a gripping part 53 (described later) which grips an upper-end part of a flap part (an outer flap part) B1R of the large box B1. The holding mechanism 54 is provided to the hand base part 51, and has a holding part 55 (described later) which holds the inner box B2. Similarly, the second hand 6 is provided with a hand base part 61, a gripping mechanism 62 with a gripping part 63, and a holding mechanism 64 with a holding part 65.

Below, regarding the components 51, 52, 54, 61, 62, and 64 of the hands 5 and 6, when the first hand 5 and the second hand 6 need to be distinguished, the components for the first hand 5 may be referred to as "a first hand base part 51," "a first gripping mechanism 52," and "a first holding mechanism 54," respectively, and the components for the second hand 6 may be referred to as "a second hand base part 61," "a second gripping mechanism 62," and "a second holding mechanism 64," respectively.

Each of the gripping mechanisms 52 and 62 is provided with a pair of contact pieces opposing to each other, as a gripping part 53 or 63, and has a clamp structure in which the pair of contact pieces open and close to pinch a to-be-gripped object in a plate-like shape from both surfaces. Moreover, each of the holding mechanisms 54 and 64 has a suction structure as a holding part 55 or 65. In this embodiment, each of the holding parts 55 and 65 has the suction structure comprised of a plurality of (six) suction parts.

In order to place, into the large box B1 for the packing, the plurality of inner boxes B2 accommodating objects to be packed, respectively, the controller 9 controls the operations of the first arm 3, the first hand 5, the second arm 4, and the second hand 6 so as to perform the developing operation of the large box B1 and the accommodating operation of the inner box B2 into the large box B1.

In the developing operation of the large box B1, the first arm 3 and the second arm 4 move in the horizontal plane to develop the large box B1 while the gripping parts 53 and 63 of the gripping mechanisms 52 and 62 grip the upper-end parts of the flap parts of the folded large box B1 (upper-end parts of the outer flap parts B1R and B1L), respectively. In the accommodating operation of the inner box B2, the first arm 3 and the second arm 4 move so that the inner box B2 is accommodated in the developed large box B1 while the holding parts 55 and 65 of the holding mechanisms 54 and 64 hold the inner box B2.

In the developing operation and the accommodating operation, the controller 9 controls the fifth members 35 and 45 of the arms 3 and 4 so as not to change their postures. That is, the robot 1 achieves the developing operation and the accommodating operation by combining the operation in which the positions of the tip-end parts of the arms 3 and 4 do not change horizontally but change vertically, and the operation in which the tip-end parts of the arms 3 and 4 move in the plane parallel to the horizontal plane.

Therefore, when considering orthogonal coordinates in which a base-end part of each of the first hand 5 and the second hand 6 is set as an origin, a vertical axis in the orthogonal coordinates (axis in a Z-direction described later) does not rotate about an axis parallel to the horizontal plane. Below, such orthogonal coordinate systems (the second direction Z vertical to the horizontal plane, and first directions X1 and X2, and third directions Y1 and Y2 parallel to the horizontal plane) in which the base-end parts of the hands 5 and 6 (tip-end parts of the arms 3 and 4) are set as the origins, respectively, are used in order to describe the configurations of the hands 5 and 6. The orthogonal coordinate systems of the hands 5 and 6 are set to be reflection symmetry with each other when the positions of the tip-end parts of the arms 3 and 4 are symmetrically positioned with respect to a plane including the common rotation axis C and perpendicular to the horizontal plane.

In order to efficiently perform such developing operation of the large box B1 and accommodating operation of the inner box B2 by the single robot 1, the first hand 5 and the second hand 6 are configured so that the gripping parts 53 and 63 of the gripping mechanisms 52 and 62 are located to be separated from the holding parts 55 and 65 of the holding mechanisms 54 and 64, respectively, in the plan view and in the vertical direction.

In more detail, the hand base parts 51 and 61 include, respectively, first extending parts 56 and 66 which extend in the first directions (horizontal direction: X1 and X2), and second extending parts 57 and 67 which are attached to first end parts 56a and 66a of the first extending parts 56 and 66, and extend in the second direction (downward: Z) orthogonal to the first directions X1 and X2. Each of the first extending parts 56 and 66 is comprised of a plate-like member, and each of the second extending parts 57 and 67 is comprised of a plurality of (four) stick members.

Moreover, the gripping mechanisms 52 and 62 are attached to second end parts 56b and 66b of the first extending parts 56 and 66, respectively, so that the gripping parts 53 and 63 are oriented in the second direction Z. Moreover, the holding mechanisms 54 and 64 are attached to tip-end parts of the second extending parts 57 and 67, respectively, so that the holding parts 55 and 65 are oriented in the second direction Z.

According to such a configuration, the attached positions of the gripping parts 53 and 63 of the gripping mechanisms 52 and 62 are, respectively, separated from the attached positions of the holding parts 55 and 65 of the holding mechanisms 54 and 64 in the horizontal direction (the first directions X1 and X2) by the length of the first extending parts 56 and 66. Moreover, the attached positions of the gripping parts 53 and 63 of the gripping mechanisms 52 and 62 are, respectively, separated from the attached positions of the holding parts 55 and 65 of the holding mechanisms 54 and 64 in the vertical direction (the second direction Z) by the length of the second extending parts 57 and 67.

Moreover, the hand base parts 51 and 61 include, respectively, third extending parts 58 and 68 which extend from the base-end parts of the hand base parts 51 and 61 in the third directions (horizontal direction: Y1 and Y2) orthogonal to the first directions X1 and X2 and the second direction Z. Each of the third extending parts 58 and 68 is comprised of a plate-like member. The second end parts 56b and 66b of the first extending parts 56 and 66 are attached to tip-end parts of the third extending parts 58 and 68, respectively. Moreover, the first end parts 56a and 66a of the first extending parts 56 and 66 are attached to base-end parts of the second extending parts 57 and 67, respectively. That is, in this embodiment, the first end parts 56a and 66a of the first extending parts 56 and 66 are tip-end parts of the first extending parts 56 and 66, respectively, and the second end parts 56b and 66b of the first extending parts 56 and 66 are base-end parts of the first extending parts 56 and 66, respectively. Each of the gripping parts 53 and 63 is configured so that the pair of contact pieces open and close in the first direction X1 or X2.

As described above, the first hand 5 and the second hand 6 according to this embodiment are configured to be reflection symmetry with each other in a state the third directions Y1 and Y2 are oriented in the same direction (the state illustrated in FIG. 2).

Figure 4:
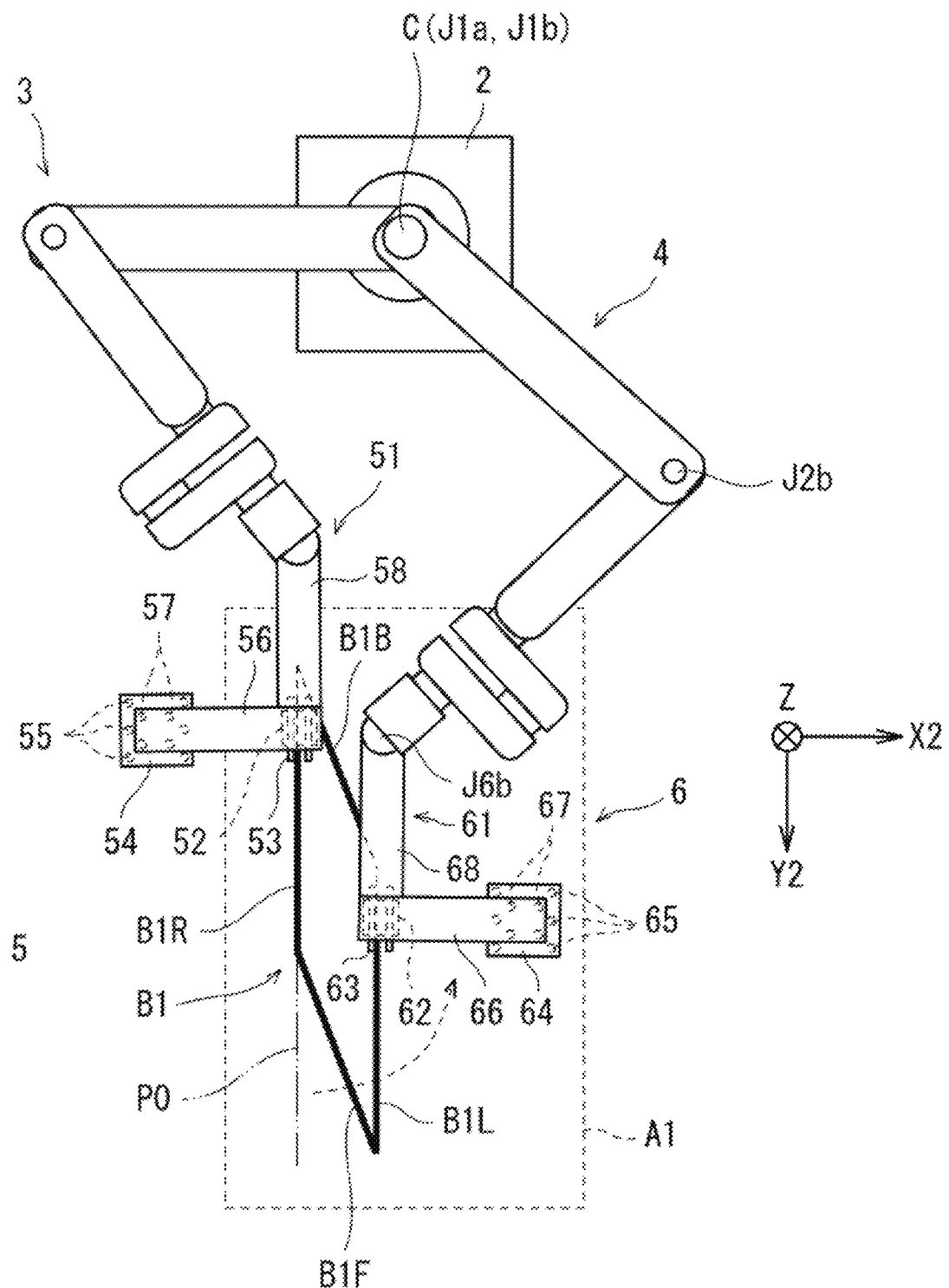
FIG. 4 is a plan view of the box packing device illustrated in FIG. 2 when a developing operation is performed.
Figure 5:
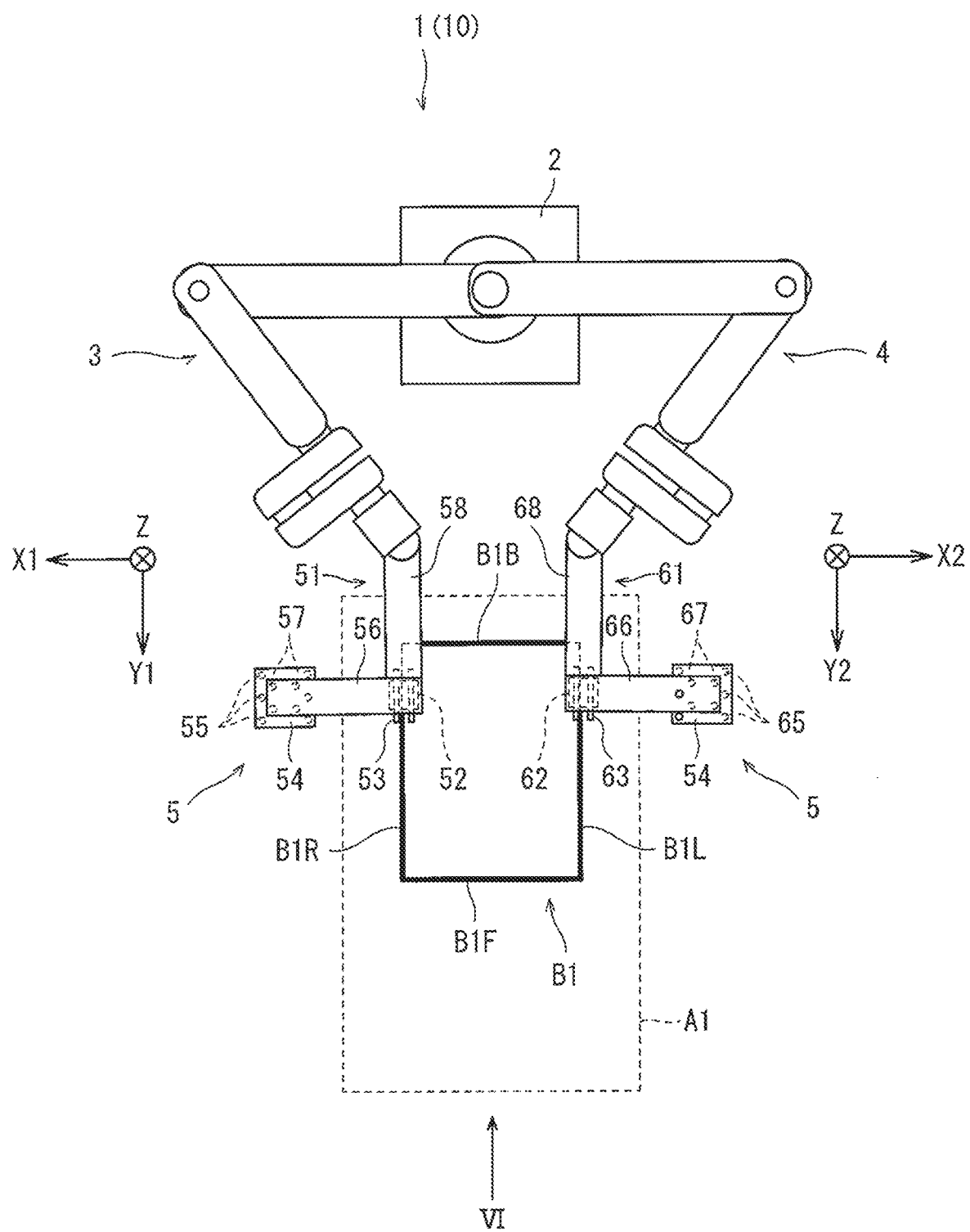
FIG. 5 is a plan view of the box packing device illustrated in FIG. 2 when the developing operation is finished.

Below, the developing operation of the large box B1 is described. FIG. 4 is a plan view of the box packing device illustrated in FIG. 2 when the developing operation is performed. FIG. 5 is a plan view of the box packing device illustrated in FIG. 2 when the developing operation is finished. Note that FIG. 1 also illustrates the state the developing operation is finished.

As described above, the large-box setting device places the large box B1 in the folded state at an initial position P0 in the right-end part of the packing area A1. At this time, the folded large box B1 is in a state in which an inner surface of the outer flap part B1R is in contact with an inner surface of an inner flap part B1B, the outer flap part B1L is in contact with an inner flap part B1F, and a part of the outer flap part B1L is in contact with a part of the outer flap part B1R.

The controller 9 controls the first arm 3 so that the gripping part 53 of the first gripping mechanism 52 grips the upper-end part of the outer flap part B1R on the right side (when seen from the pedestal 2) of the large box B1 which is placed at the initial position P0. For example, the gripping part 53 grips the upper-end part of the outer flap part B1R on a side close to the pedestal 2 (close to the inner flap part B1B). Similarly, the controller 9 controls the second arm 4 so that the gripping part 63 of the second gripping mechanism 62 grips the upper-end part of the outer flap part B1L on the left side (when seen from the pedestal 2) of the large box B1 which is placed at the initial position P0.

The position in the front-and-rear direction where the gripping part 53 of the first gripping mechanism 52 grips the upper-end part of the outer flap part B1R (a distance from an connecting end to the inner flap part B1B) is the same as the position in the front-and-rear direction where the gripping part 63 of the second gripping mechanism 62 grips the upper-end part of the outer flap part B1L. However, since the large box B1 placed at the initial position P0 is folded, the positional coordinates of the gripping part 53 of the first gripping mechanism 52 and the positional coordinates of the gripping part 63 of the second gripping mechanism 62 offset from each other in the third directions Y1 and Y2 by the length of the inner flap part B1B.

As described above, the controller 9 executes controls to develop the large box B1 by moving the first arm 3 and/or the second arm 4 in the horizontal plane while the gripping parts 53 and 63 of the gripping mechanisms 52 and 62 gripping the outer flap parts B1R and B1L, respectively. In this embodiment, the first arm 3 does not move, but the second arm 4 moves in an arc shape in the horizontal plane so that the inner flap part B1B rotates centering on a connecting end to the outer flap part B1R until an angle between the inner flap part B1B and the outer flap part B1R becomes 90°. That is, the large box B1 is developed by the joint axes J1b, J2b and J6b of the second arm 4 rotating while the gripping parts 53 and 63 grip the outer flap parts B1R and B1L, respectively. At this time, as illustrated in FIG. 5, the first extending parts 56 and 66 are located on the same straight line, and the third extending parts 58 and 68 are located to be parallel to each other.

Note that after the developing operation by the second arm 4 as described above, the controller 9 may control the arms 3 and 4 so that the hands 5 and 6 move outwardly in the left-and-right direction (the direction to widen the distance between the gripping parts 53 and 63) while the gripping parts 53 and 63 of the gripping mechanisms 52 and 62 grip the outer flap parts B1R and B1L, respectively. Accordingly, a biasing-assist operation for maintaining the state where the outer flap parts B1R and B1L of the large box B1 open may be performed. Moreover, after the developing operation by the second arm 4 as described above, the controller 9 may control the arms 3 and 4 to move outwardly in the front-and-rear direction of the large box B1 while side surfaces of the holding mechanisms 54 and 64 are in contact with inner surfaces of the inner flap parts B1B and B1F, respectively. Therefore, a biasing-assist operation for maintaining the state where the inner flap parts B1B and B1F of the large box B1 open may be performed.

Figure 6:
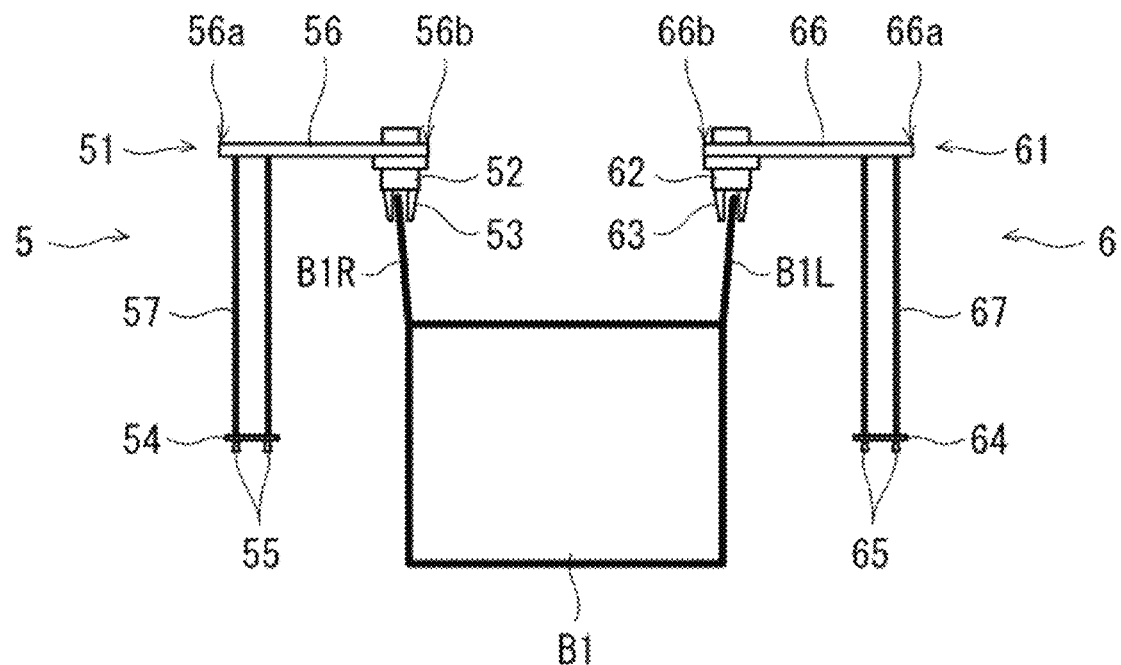
FIG. 6 is a front view illustrating a positional relationship between a first hand and a second hand, and a large box during the developing operation.
Figure 6:

FIG. 6 is a front view illustrating a positional relationship between the first hand and the second hand, and the large box during the developing operation. In FIG. 6, illustration of the inner flap parts B1B and B1F of the large box B1 is omitted. FIG. 6 is a view seen in the direction indicated by an arrow V1 in FIG. 5. However, during the developing operation, the positional relationship between the hands 5 and 6 and the large box B1 does not change, except for the distance between the hands 5 and 6 when seen in the direction of the arrow V1. That is, also in FIG. 4, the positional relationship as illustrated in FIG. 6 is established.

As illustrated in FIG. 6, when the gripping parts 53 and 63 of the gripping mechanisms 52 and 62 grip the upper-end parts of the outer flap parts B1R and B1L of the large box B1, respectively, the first hand 5 and the second hand 6 are located so that the holding mechanisms 54 and 64 locate outward of the large box B1. Therefore, during the developing operation of the large box B1, the holding mechanisms 54 and 64 are securely prevented from interfering with the large box B1.

After the developing operation, the robot 1 performs an operation to accommodate in the large box B1 the internal plate B3 placed in the internal-plate placing area A3. In this embodiment, the controller 9 controls the first arm 3 so that the first holding mechanism 54 of the first hand 5 locates above the internal plate B3 which is placed in the internal-plate placing area A3. The first hand 5 holds the internal plate B3 by the holding part 55 of the first holding mechanism 54 sucking an upper surface of the internal plate B3.

The controller 9 controls the first arm 3 so that the internal plate B3 is accommodated in the large box B1.

At this time, for the accommodating operation of the inner box B2, which is the subsequent process, the controller 9 controls the second arm 4 so that the second hand 6 moves above the inner-box placing area A4 of the inner-box transfer device 80. Therefore, the second arm 4 can be prevented from interfering with the accommodating operation of the internal plate B3 performed by the first arm 3 and the first hand 5.

Figure 7:
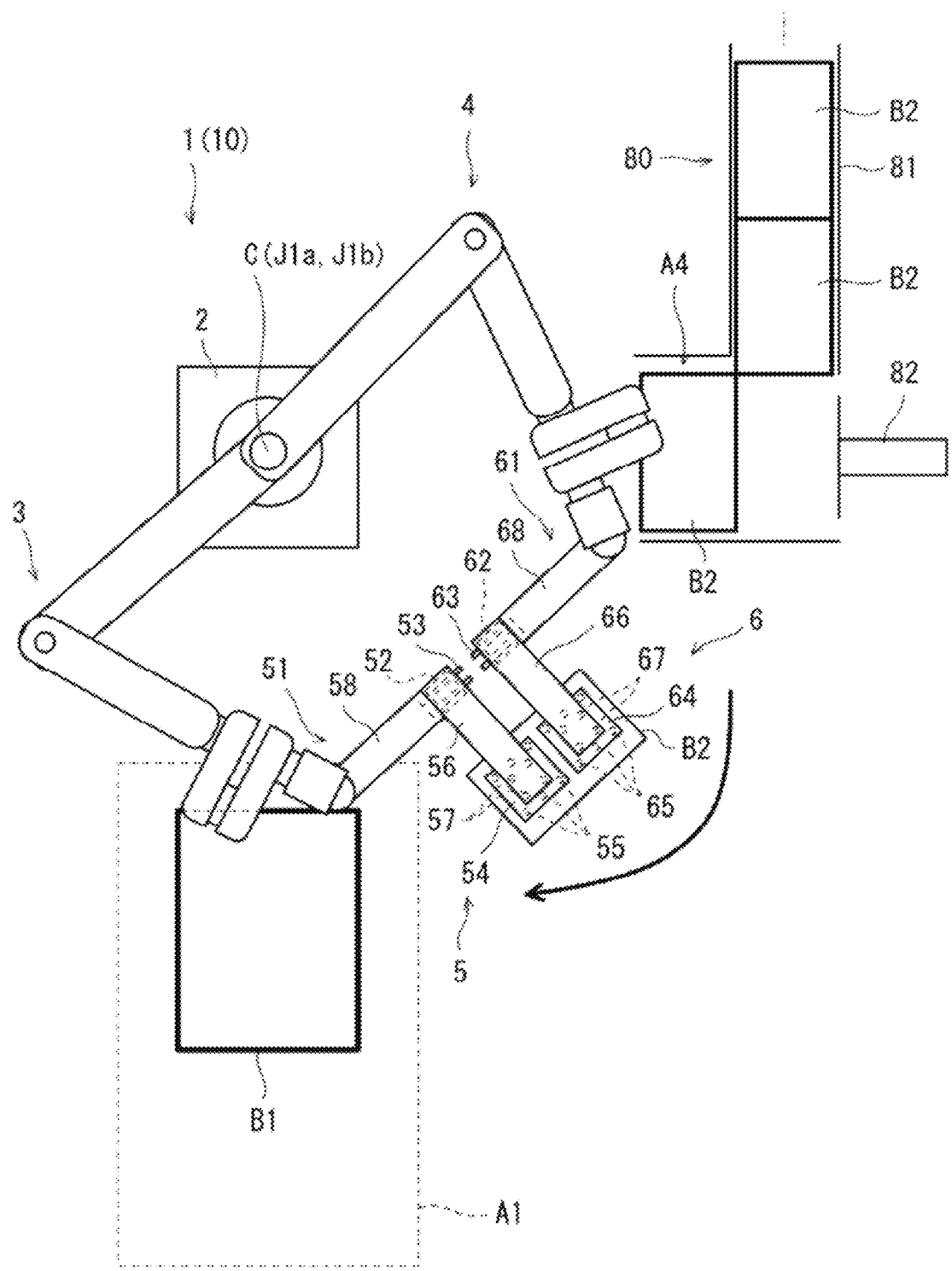
FIG. 7 is a plan view of the box packing device illustrated in FIG. 2 when an accommodating operation is performed.
Figure 8:
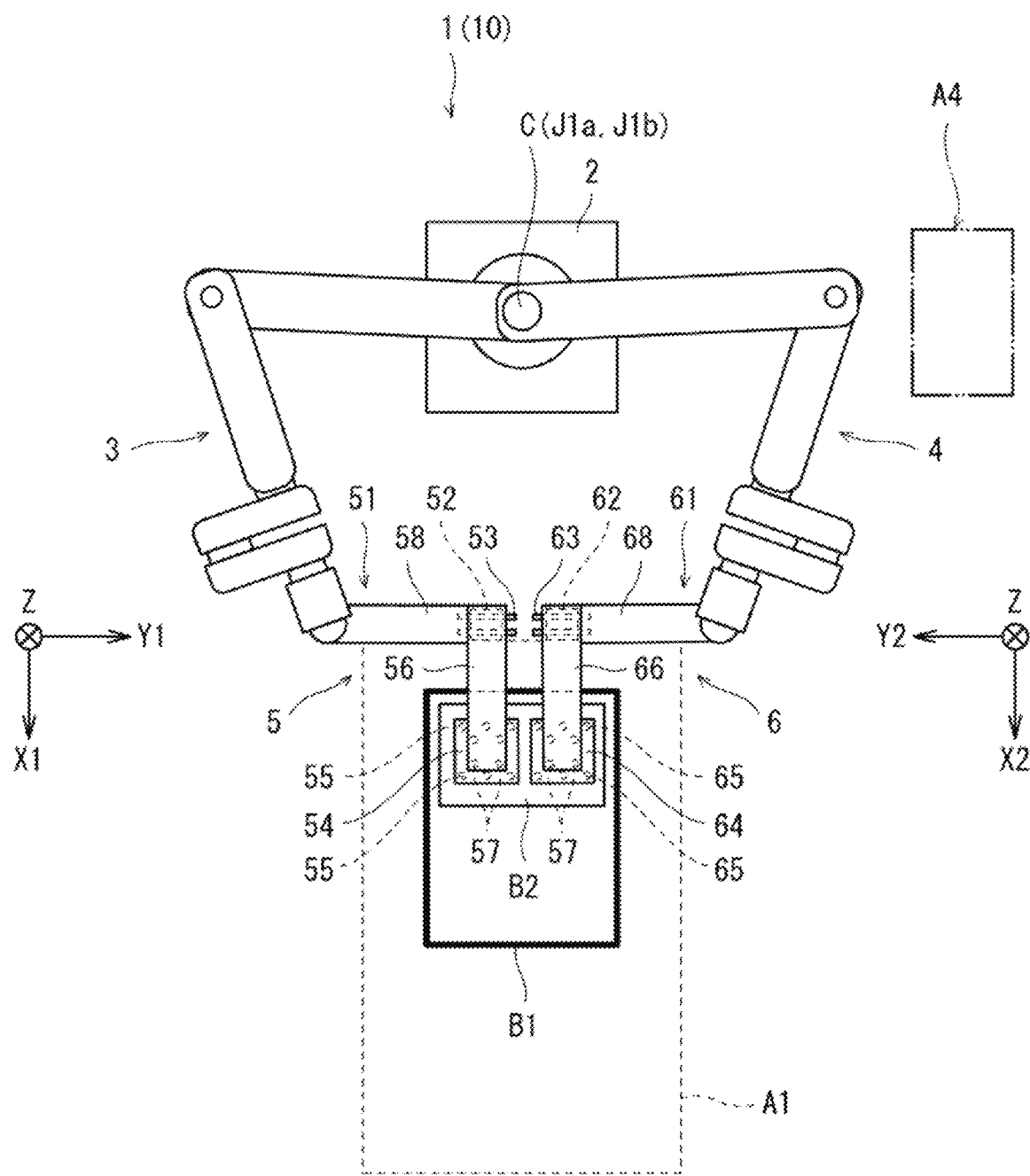
FIG. 8 is a plan view of the box packing device illustrated in FIG. 2 when the accommodating operation is finished.
Figure 9:
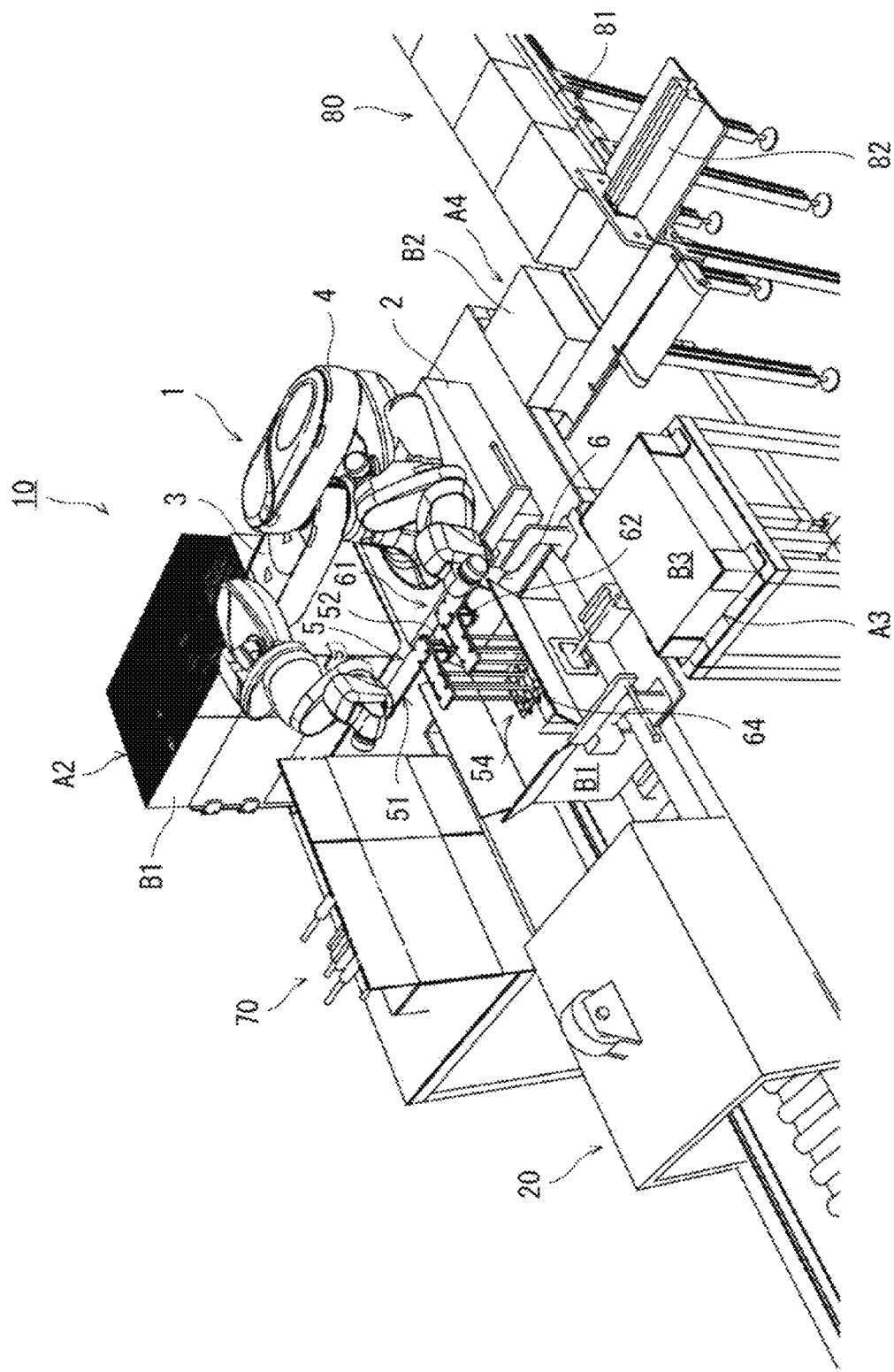
FIG. 9 is a perspective view of the box packing device illustrated in FIG. 1 when the accommodating operation is finished.

Below, the accommodating operation of the inner box B2 is described. FIG. 7 is a plan view of the box packing device illustrated in FIG. 2 when the accommodating operation is performed. FIG. 8 is a plan view of the box packing device illustrated in FIG. 2 when the accommodating operation is finished. FIG. 9 is a perspective view of the box packing device illustrated in FIG. 1 when the accommodating operation is finished. Note that the finished state of the accommodating operation in FIGS. 8 and 9 is the state a first inner box B2 can be accommodated in the large box B1.

After the accommodating operation of the internal plate B3, the controller 9 controls the first arm 3 so that the first hand 5 also moves above the inner-box placing area A4 of the inner-box transfer device 80. In more detail, the controller 9 controls the first arm 3 and the second arm 4 so that the two holding mechanisms 54 and 64 are adjacently positioned so that the position of the holding mechanism 54 in the first direction X1 coincides with the position of the holding mechanism 64 in the first direction X2 above the inner-box placing area A4. After the holding mechanisms 54 and 64 are positioned above the inner box B2 placed in the inner-box placing area A4 as described above, the two holding parts 55 and 65 suck an upper surface of the inner box B2 so as to hold the inner box B2. That is, the holding mechanisms 54 and 64 of the hands 5 and 6 hold one inner box B2 while the holding mechanisms 54 and 64 of the hands 5 and 6 are aligned so that the position of the holding mechanism 54 in the first direction X1 coincides with the position of the holding mechanism 64 in the first direction X2. At this time, the first extending parts 56 and 66 are located to be parallel to each other, and the third extending parts 58 and 68 are located on the same straight line.

After the holding mechanisms 54 and 64 of the hands 5 and 6 hold the inner box B2, the controller 9 collaboratively controls the two arms 3 and 4 so that the inner box B2 held by the holding parts 55 and 65 is placed into the developed large box B1. That is, the controller 9 moves the held inner box B2 by collaboratively controlling the two arms 3 and 4 while maintaining the positional relationship between the two holding mechanisms 54 and 64.

First, the controller 9 operates to change the vertical positions of the tip-end parts of the two arms 3 and 4 without changing the horizontal positions, so as to lift up the inner box B2 held by the holding parts 55 and 65. Moreover, as illustrated in FIG. 7, the controller 9 operates to move the tip-end parts of the arms 3 and 4 (the hands 5 and 6) in the plane parallel to the horizontal plane so as to locate the inner box B2 held by the holding parts 55 and 65 above a given placing position in the large box B1. After this, the controller 9 operates to change the vertical positions of the tip-end parts of the two arms 3 and 4 without changing the horizontal positions, so as to place the inner box B2 held by the holding parts 55 and 65 at the placing position in the large box B1.

Figure 10:
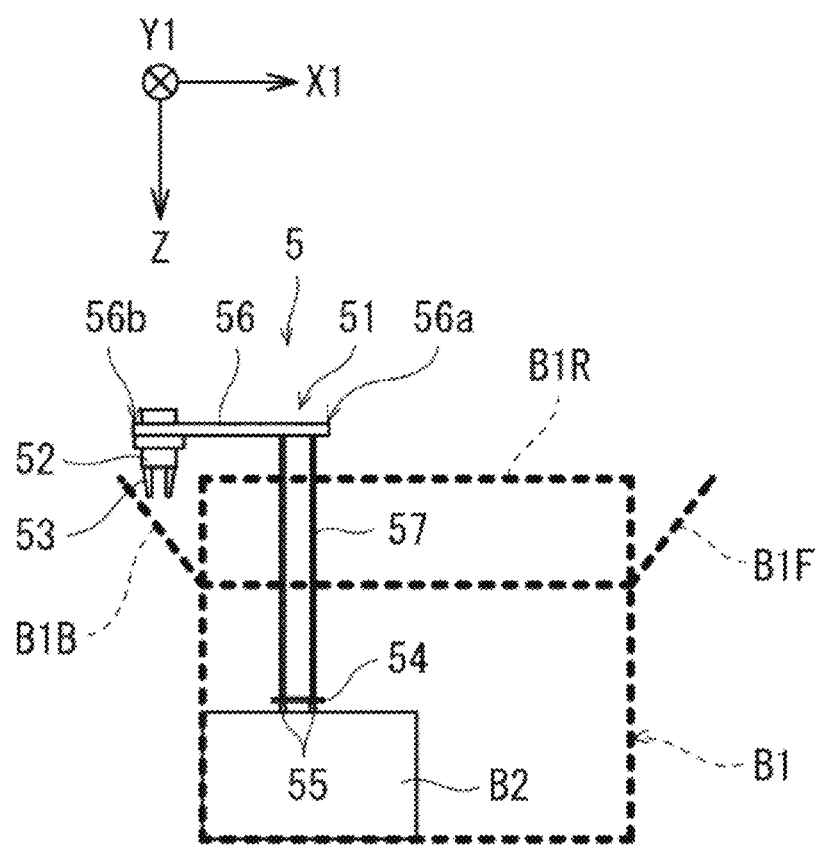
FIG. 10 is a side view illustrating a positional relationship between the first hand, and the large box and an inner box during the accommodating operation.

FIG. 10 is a side view illustrating a positional relationship between the first hand, the large box and the inner box during the accommodating operation. FIG. 10 is a view of the first hand 5 illustrated in FIG. 8 when seen in the third direction Y1. The large box B1 is illustrated by a broken line. In FIG. 10, the first hand 5 and the inner box B2 inside the large box B1 are visible through the large box B1. Note that although the second hand 6 also has a positional relationship similar to FIG. 10, the first hand 5 is described as an example below.

As illustrated in FIG. 10, when the first hand 5 places the inner box B2 held by the holding part 55 onto a bottom surface of the large box B1 in a state the inner box B2 contacts a side surface of the large box B1, which is connected to the inner flap part B1B of the large box B1, the gripping part 53 of the gripping mechanism 52 is located outward of the side surface (the robot side when seen from the robot 1 facing the packing area A1) of the large box B1, and higher than an lower end of the inner flap part B1B. In other words, in the plan view, the gripping mechanisms 52 and 62 are placed between the rotation axis C of the robot 1 and the holding mechanisms 54 and 64.

That is, the length of the second extending part 57 in the second direction (the direction Z) is set so that the distance in the vertical direction (the second direction Z) between tip-end part of the holding mechanism 54 (a suction surface of the holding part 55) and tip-end part of the gripping mechanism 52 (the lower end of the gripping part 53) is longer than a length obtained by subtracting a height of the inner box B2 from a length between the bottom surface of the large box B1 and the lower end of the inner flap part B1B (a height of the large box B1 when the flap parts are closed). Moreover, moving distances of the tip-end parts of the arms 3 and 4 in the vertical direction are set, respectively, to substantially the same as lengths from the tip-end parts of the arms 3 and 4 to the tip-end parts (suction surfaces) of the holding parts 55 and 65. Moreover, as illustrated in FIG. 8, in the plan view, the gripping mechanisms 52 and 62 are placed between the rotation axis C of the robot 1 and the holding mechanisms 54 and 64.

Therefore, in the accommodating operation of the inner box B2 into the large box B1, the gripping mechanism 52 can securely be prevented from interfering with the large box B1. Note that, during the accommodating operation, the inner flap part B1B is movable with respect to a body part of the large box B1. Therefore, even if the gripping part 53 slightly contacts the inner flap part B1B during the accommodating operation, it does not lead to a problem. However, it is also possible to set the length of the first extending part 56 and/or the second extending part 57 so that the gripping part 53 does not contact the inner flap part B1B.

The large box B1 is formed in a size capable of accommodating a plurality of inner boxes B2. In this embodiment, when seen in the direction the robot 1 facing the packing area A1, two inner boxes B2 are placeable in the front-and-rear direction, and two inner boxes B2 are placeable in the height direction. That is, four inner boxes B2 are placeable into the large box B1. In this case, the controller 9 repeats the accommodating operation of the inner box B2 four times for one large box B1, by changing the placing positions every time.

In the accommodating operation of the inner boxes B2 into the large box B1, after the first inner box B2 is placed at a given position (lower tier on the robot 1 side), the controller 9 again moves the hands 5 and 6 to the inner-box placing area A4 of the inner-box transfer device 80, and controls the arms 3 and 4 to hold a second inner box B2 which is placed in the inner-box placing area A4 by using the holding parts 55 and 65.

Then, the controller 9 controls the arms 3 and 4 to place the inner box B2 held by the holding parts 55 and 65 above a given placing position in the large box B1. At this time, the placing position of the second inner box B2 is, for example, on the lower tier and on the far side from the robot 1. Below, similarly, a third inner box B2 is placed at a placing position on the upper tier and on the robot 1 side, and a fourth inner box B2 is placed at a placing position on the upper tier and on the far side from the robot 1. Note that after the two inner boxes B2 are placed on the lower tier, the controller 9 may execute the control to place the internal plate B3 onto the two inner boxes B2 on the lower tier by again using the first arm 3.

After a predetermined number of (four) inner boxes B2 are placed in the large box B1, the flap parts B1B, B1F, B1R, and B1L are closed while the large box B1 is transferred outside the packing area A1 by the large-box transfer device 20, and then, the packing operation ends. Note that before the large-box transfer device 20 transfers the large box B1, the controller 9 may control the arms 3 and 4 so that the hands 5 and 6 move inwardly in the left-and-right direction of the large box B1 while the gripping parts 53 and 63 of the gripping mechanisms 52 and 62 gripping the outer flap parts B1R and B1L, respectively. Accordingly, the operation to close the outer flap parts B1R and B1L of the large box B may be assisted.

According to the box packing device 10 of this embodiment, in order to develop the large box B1, the hands 5 and 6 are provided, respectively, with the gripping mechanisms 52 and 62 including the gripping parts 53 and 63 which grip the upper-end parts of the flap parts (outer flap parts) B1R and B1L of the large box B1. The hands 5 and 6 are also provided, respectively, with the holding mechanisms 54 and 64 including the holding parts 55 and 65 which hold the inner box B2. Moreover, the gripping parts 53 and 63 are located to be separated from the holding parts 55 and 65, respectively, in the plan view and in the vertical direction.

According to this configuration, the holding parts 55 and 65 are located at the positions where the holding parts 55 and 65 do not overlap with the gripping parts 53 and 63, respectively, in the plan view. Therefore, when the gripping parts 53 and 63 grip the upper-end parts of the flap parts (outer flap parts) B1R and B1L of the large box B1, respectively, in order to develop the large box B1, the holding mechanisms 54 and 64 can be prevented from interfering with the large box B1 during the developing operation of the large box B1. Moreover, the holding parts 55 and 65 are vertically separated from the gripping parts 53 and 63, respectively. Therefore, the gripping mechanisms 52 and 62 can be prevented from interfering with the large box B1 during the accommodating operation of the inner box B2, when the holding parts 55 and 65 move into the large box B1 (i.e., below the lower end of the flap part B1B) while holding the inner box B2. Thus, the works of developing the large box B1 and placing the plurality of inner boxes B2 into the large box B1 can be efficiently performed by the sole box packing device 10 (robot 1).

Note that in this specification and the claims, the "gripping part" (53 or 63) refers to a part which contacts the large box B1 for gripping the flap part B1R or B1L of the large box B1 by the gripping mechanism 52 or 62. Similarly, in this specification and the claims, the "holding part" (55 or 65) refers to a part which contacts the inner box B2 for holding the inner box B2 by the holding mechanism 54 or 64.

Therefore, in this specification and the claims, the phrase "the gripping part of the gripping mechanism and the holding part of the holding mechanism are located to be separated from each other" means that the position where the gripping mechanism 52 or 62 contacts with the large box B1 during the developing operation of the large box B1, does not overlap in the plan view with the position where the holding mechanism 54 or 64 contacts with the inner box B2 during the accommodating operation of the inner box B2. For example, a part of the gripping mechanism 52 or 62 except for the gripping part 53 or 63 may overlap with a part of the holding mechanism 54 or 64 except for the holding part 55 or 65, in the plan view. The parts of the gripping mechanisms 52 and 62 except for the gripping parts 53 and 63 are, for example, movable mechanisms (bases of the gripping parts) and/or actuators for the gripping operation by the gripping parts 53 and 63. The parts of the holding mechanisms 54 and 64 except for the holding parts 55 and 65 are, for example, actuators and/or intake paths for the holding operation (sucking operation) by the holding parts 55 and 65.

Moreover, in this embodiment, the gripping parts 53 and 63 are provided to the first extending parts 56 and 66, and the holding parts 55 and 65 are provided to the second extending parts 57 and 67. Therefore, during one of the developing operation of the large box B1 and the accommodating operation of the inner box B2, it is possible to prevent the unused mechanism from interfering with the ongoing operation by the simple configuration, without the gripping parts 53 and 63 or the holding parts 55 and 65 being moved so as to avoid the interference (i.e., without changing the relative positions of the gripping parts 53 and 63 with respect to the holding parts 55 and 65).

Moreover, in this embodiment, the coaxial dual-arm robot 1 performs the developing operation and the accommodating operation as described above. Since the two arms 3 and 4 collaboratively operate, the robot 1 can more efficiently perform the developing operation of the large box B1 and the accommodating operation of the inner box B2. Moreover, since the two arms 3 and 4 are coaxially disposed on the rotation axis C, a space efficiency and controllability improve.

Embodiment 2

Figure 11:
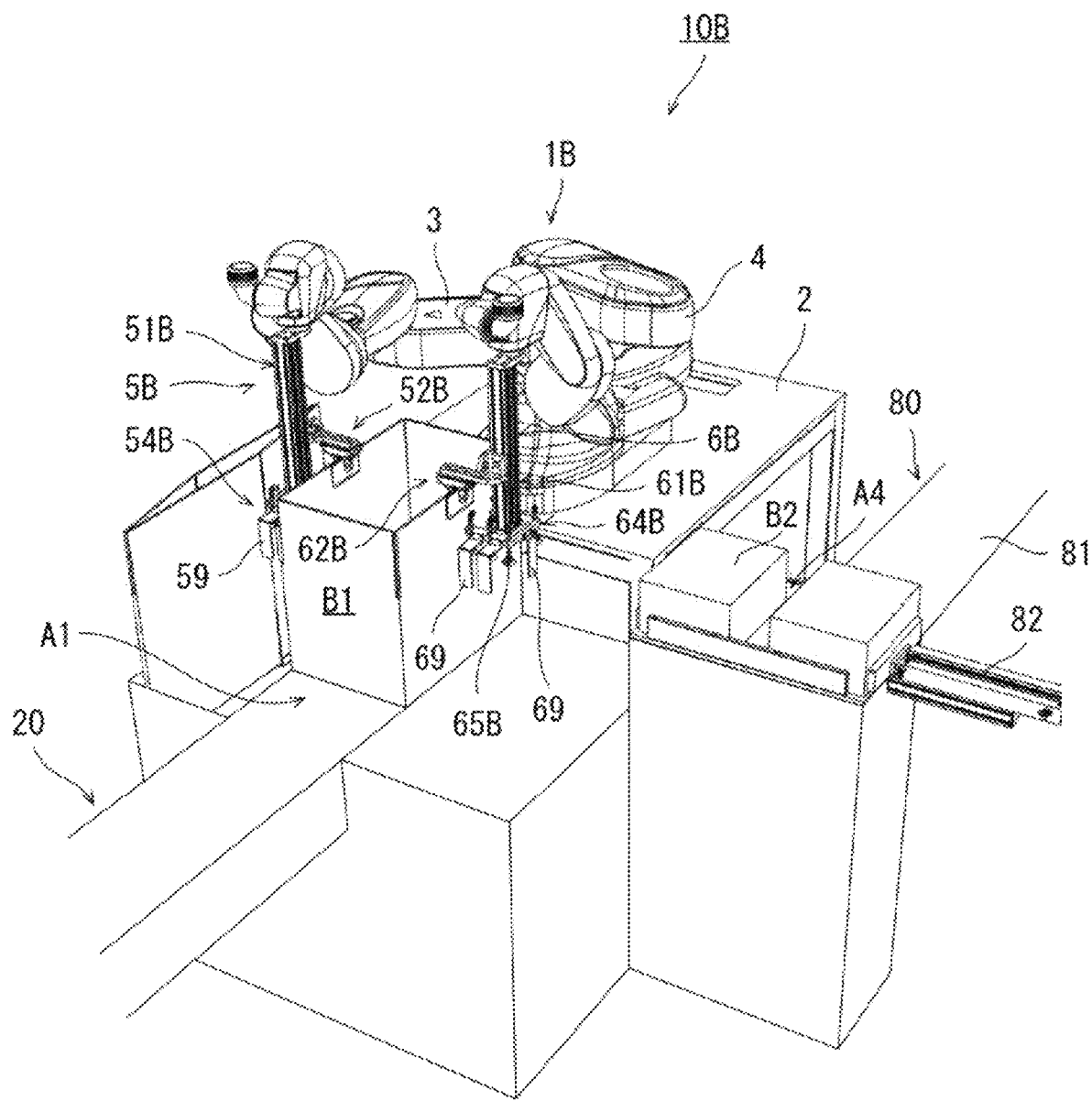
FIG. 11 is a perspective view illustrating one example of a box packing device according to Embodiment 2 of the present disclosure.
Figure 12:
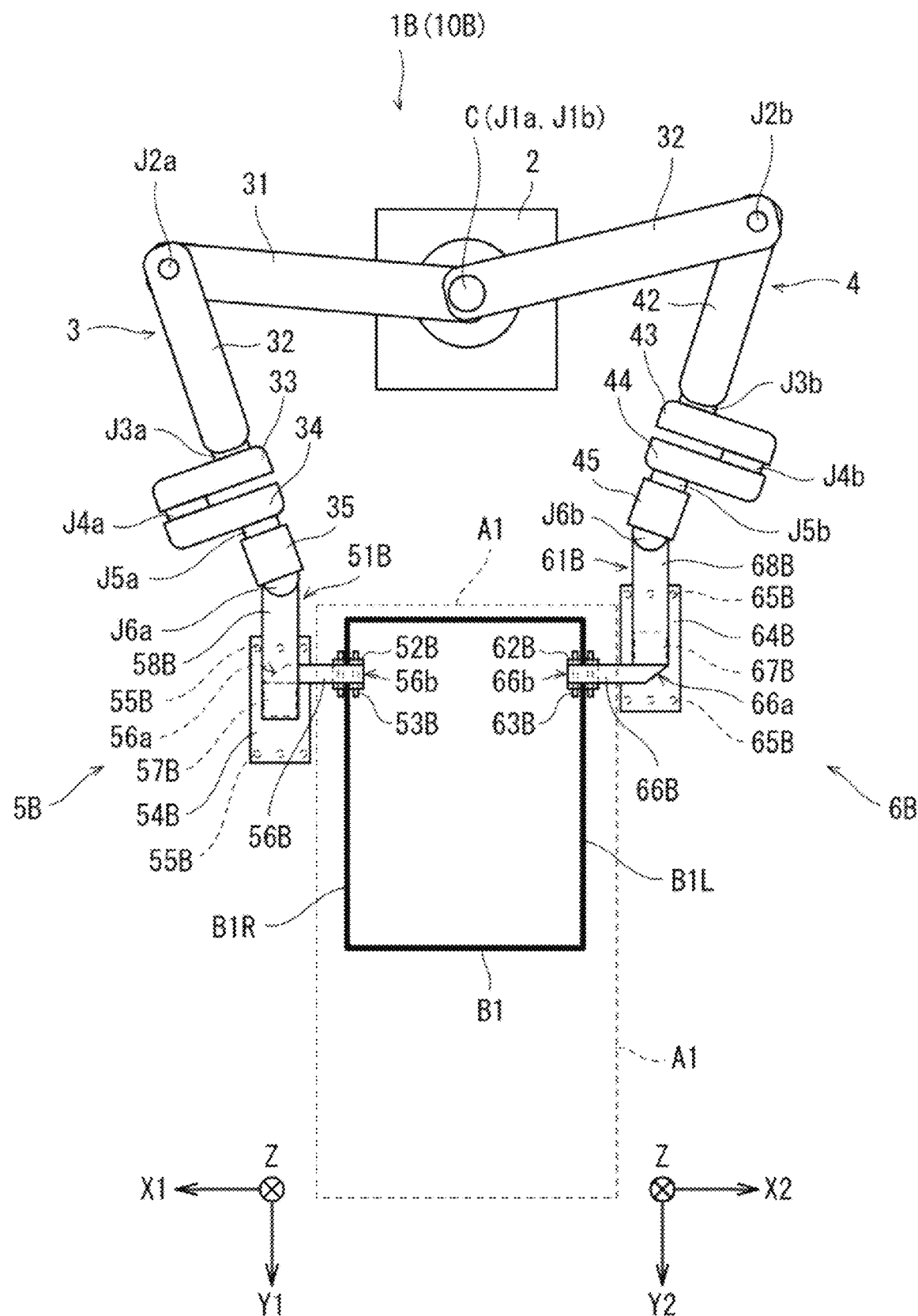
FIG. 12 is a plan view schematically illustrating a substantial configuration of the box packing device illustrated in FIG. 11.
Figure 13:
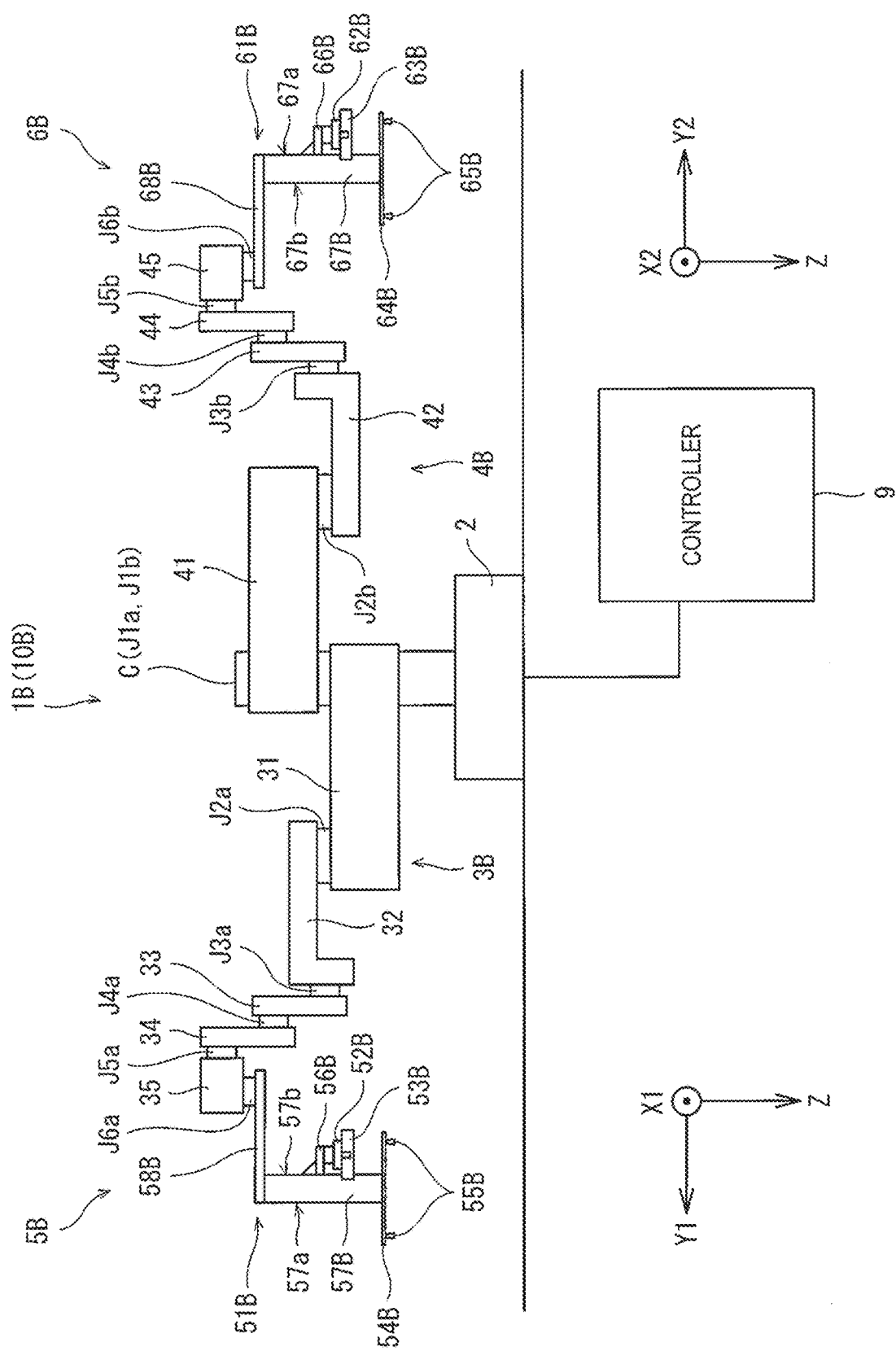
FIG. 13 is a front view of the box packing device illustrated in FIG. 12.

Next, Embodiment 2 of the present disclosure is described. FIG. 11 is a perspective view illustrating one example of a box packing device according to Embodiment 2 of the present disclosure. Moreover, FIG. 12 is a plan view schematically illustrating a substantial configuration of the box packing device illustrated in FIG. 11. Moreover, FIG. 13 is a front view of the box packing device illustrated in FIG. 12. Since FIGS. 12 and 13 schematically illustrate the configuration of FIG. 11, details of the shapes, etc. are different from the configuration of FIG. 11.

In Embodiment 2, the same reference characters are given to configurations similar to Embodiment 1 in order to omit the description. A box packing device 10B according to Embodiment 2 is different from the box packing device 10 according to Embodiment 1 in that hand base parts 51B and 61B of hands 5B and 6B are different from the hand base parts 51 and 61 of the hands 5 and 6.

Also in this embodiment, the hand base parts 51B and 61B are provided, respectively, with first extending parts 56B and 66B, second extending parts 57B and 67B, and third extending parts 58B and 68B. Directions of these parts are similar to Embodiment 1. That is, the first extending parts 56B and 66B extend in the first directions X1 and X2, respectively. The second extending parts 57B and 67B are attached to the first end parts 56a and 66a of the first extending parts 56B and 66B, respectively, and extend in the second direction Z. The third extending parts 58B and 68B extend in the third directions Y1 and Y2, respectively.

However, in the hand base parts 51B and 61B according to this embodiment, base end parts of the second extending parts 57B and 67B are attached to tip-end parts of third extending parts 58B and 68B, respectively. Moreover, the first end parts 56a and 66a of the first extending parts 56B and 66B are attached to middle parts of the second extending parts 57B and 67B, respectively. The middle parts are above tip-end parts of the respective second extending parts 57B and 67B by a given distance. That is, in this embodiment, the first end parts 56a and 56b of the first extending parts 56B and 66B are base end parts of the first extending parts 56B and 66B, respectively, and the second end parts 56b and 66b of the first extending parts 56B and 66B are tip-end parts of the first extending parts 56B and 66B, respectively. Note that, in this embodiment, each of the second extending parts 57B and 67B is comprised of one prismatic member.

Moreover, gripping mechanisms 52B and 62B of the hands 5B and 6B are attached to the second end parts 56b and 66b of the first extending parts 56B and 66B, respectively, so that gripping parts 53B and 63B extend in the second direction Z. Moreover, holding mechanisms 54B and 64B of the hands 5B and 6B are attached to tip-end parts of the second extending parts 57B and 67B, respectively, so that holding parts 55B and 65B extend in the second direction Z.

As illustrated in FIG. 13, the second extending parts 57B and 67B include, respectively, first surfaces 57a and 67a on a tip-end part side of the third extending parts 58B and 68B, and second surfaces 57b and 67b located opposite side from the first surfaces 57a and 67a. A length of the third extending part 58B of the first hand 5B (a length from a tip-end part of a first arm 3B to the attached position of the second extending part 57B) is equal to a length of the third extending part 68B of the second hand 6B (a length from a tip-end part of a second arm 4B to the attached position of the second extending part 67B). The first end part 56a of the first extending part 56B of the first hand 5B is attached to the second surface 57b of the second extending part 57B. The first end part 66a of the first extending part 66B of the second hand 6B is attached to the first surface 67a of the second extending part 67B.

That is, as illustrated in FIG. 12, the position where the first extending part 56B, to which the first gripping mechanism 52B of the first hand 5 is attached, is attached to the second extending part 57B is different from the position where the first extending part 66B, to which the second gripping mechanism 62B of the second hand 6 is attached, is attached to the second extending part 67B, in the third directions Y1 and Y2, when the third directions Y1 and Y2 are oriented in the same direction. Therefore, different from Embodiment 1, the first hand 5B and the second hand 6B according to this embodiment do not become reflection symmetry even if the third directions Y1 and Y2 are oriented in the same direction (as illustrated in FIG. 12).

Similar to Embodiment 1, a robot 1B according to this embodiment also performs the developing operation of the large box B1 and the accommodating operation of the inner box B2. FIGS. 11 and 12 illustrate a state the developing operation of the large box B1 is finished. As described above, the first hand 5B and the second hand 6B according to this embodiment are not reflection symmetry. Thus, when the first gripping mechanism 52B of the first hand 5B grips the outer flap part B1R of the large box B1, and the second gripping mechanism 62B of the second hand 6B grips the outer flap part B1L of the large box B1, the controller 9 controls the tip-end part of the first arm 3 and the tip-end part of the second arm 4 to move so as to offset from each other in the third directions Y1 and Y2 in order to locate the gripping positions of the outer flap parts B1R and B1L at the same positions in the front-and-rear direction. At this time, the first extending parts 56B and 66B are located on the same straight line, and the third extending parts 58B and 68B are located to be parallel to each other.

As described above, in terms of the developing operation of the large box B1, although the robot 1B according to this embodiment is slightly different from the robot 1 according to Embodiment 1, configurations of the first hand 5B and the second hand 6B are in common with Embodiment 1 in that when the gripping parts 53B and 63B of the gripping mechanisms 52B and 62B grip the upper-end parts of the outer flap parts B1R and B1L of the large box B1, respectively, the holding mechanisms 54B and 64B are located outward of the large box B1. Therefore, also according to this embodiment, the holding mechanisms 54B and 64B can securely be prevented from interfering with the large box B1 during the developing operation of the large box B1.

Also during the accommodating operation of the inner box B2, the controller 9 controls the operations of the arms 3B and 4B substantially similarly to Embodiment 1. That is, the holding mechanisms 54B and 64B of the hands 5B and 6B hold one inner box B2 while the holding mechanisms 54B and 64B of the hands 5B and 6B are aligned in the first directions X1 and X2. After the holding mechanisms 54B and 64B of the hands 5B and 6B holding the inner box B2, the controller 9 collaboratively controls the two arms 3 and 4 so that the inner box B2 held by the holding parts 55B and 65B are placed into the developed large box B1.

Figure 14:
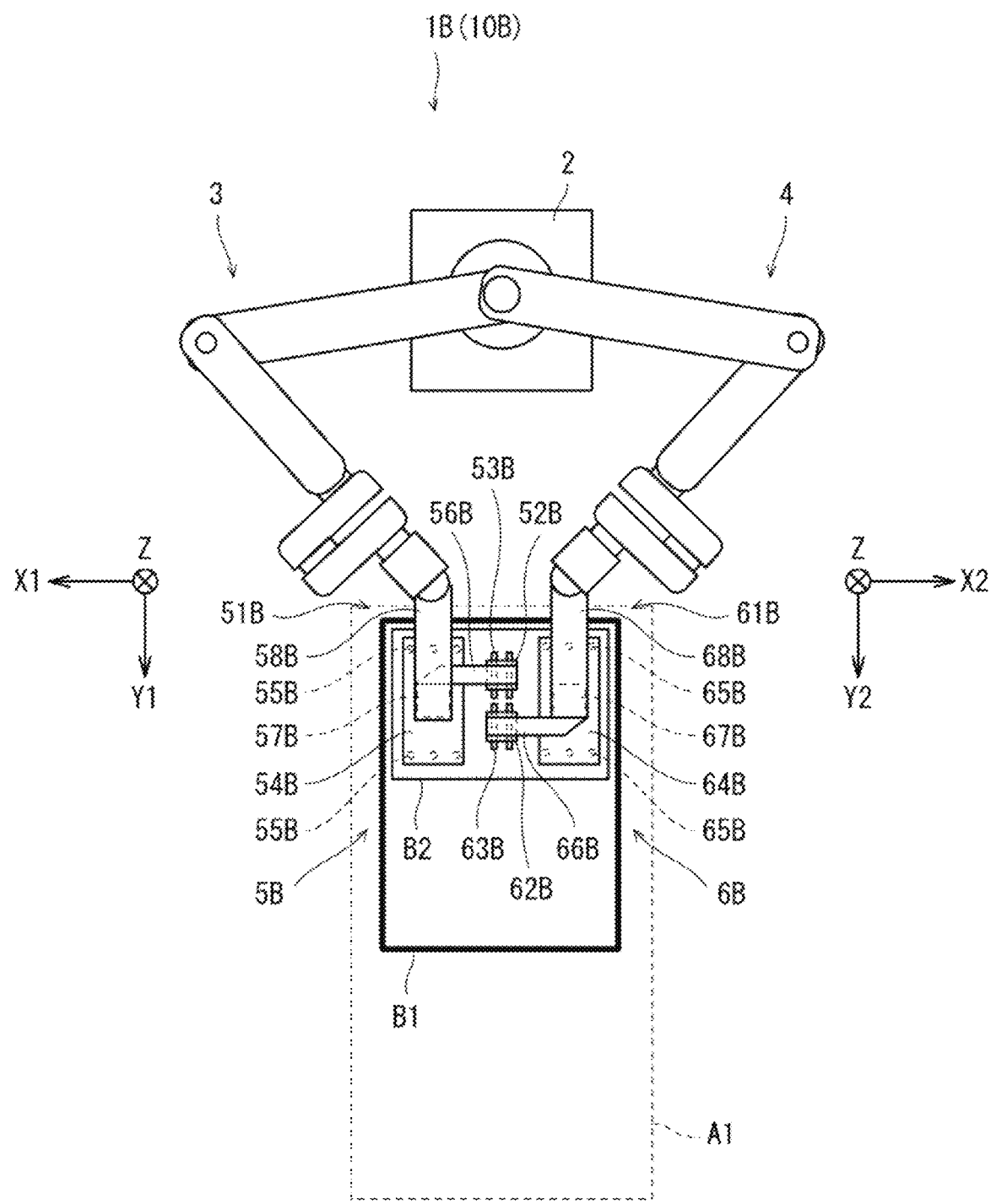
FIG. 14 is a plan view of the box packing device illustrated in FIG. 12 when an accommodating operation is finished.
Figure 15:
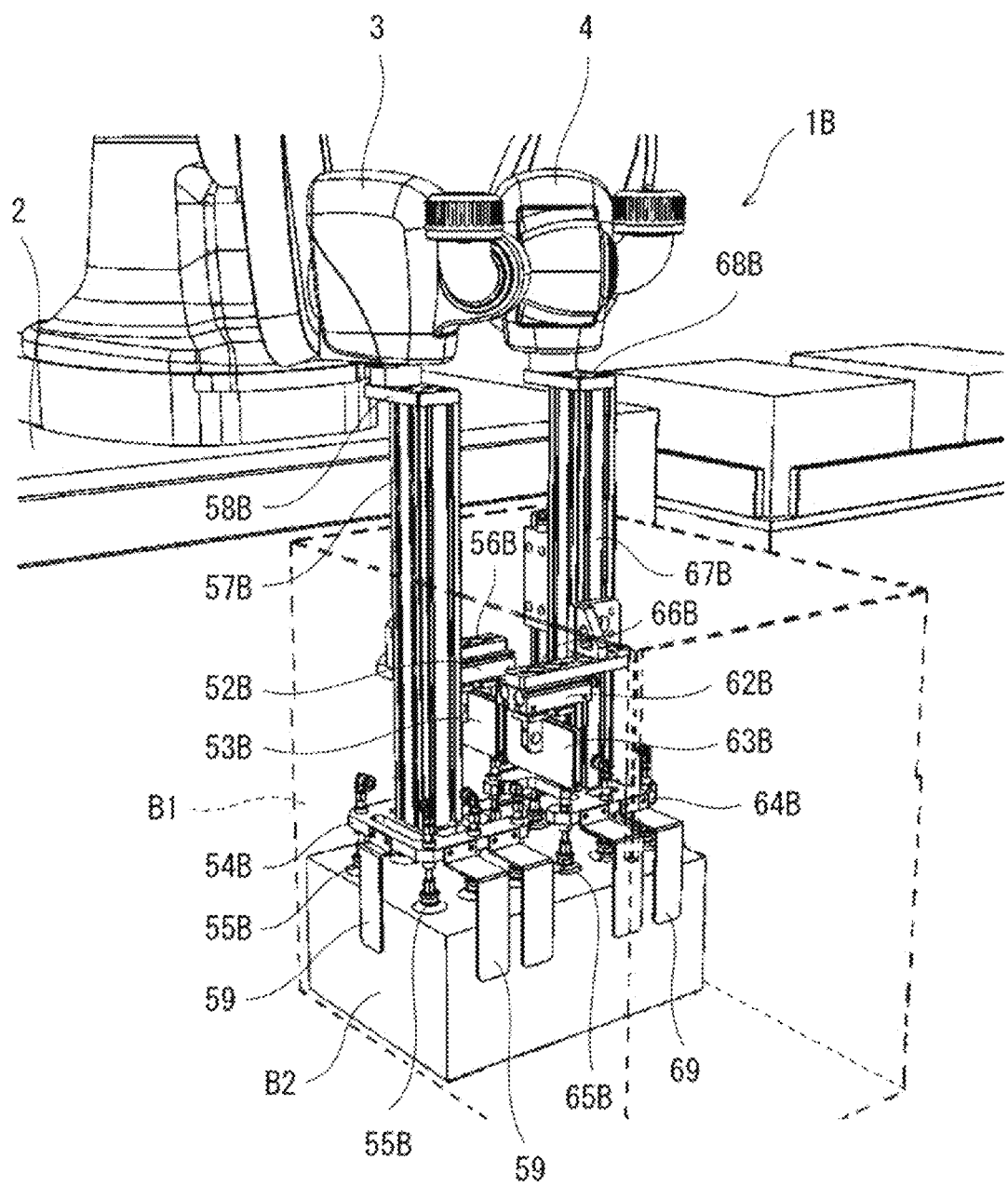
FIG. 15 is an enlarged perspective view of the box packing device illustrated in FIG. 11 when the accommodating operation is finished.

FIG. 14 is a plan view of the box packing device illustrated in FIG. 12 when the accommodating operation is finished. Moreover, FIG. 15 is an enlarged perspective view of the box packing device illustrated in FIG. 11 in the state the accommodating operation is finished. As illustrated in FIGS. 14 and 15, in this embodiment, the hands 5B and 6B are configured so that the holding mechanisms 54B and 64B are aligned so that the position of the holding mechanism 54B in the third direction Y1 coincides with the position of the holding mechanism 64B in the third direction Y2 while the holding mechanisms 54B and 64B hold one inner box B2. At this time, the positions of the second extending parts 57B and 67B in the third directions Y1 and Y2 are the same. Moreover, the first extending parts 56B and 66B are located to be parallel to each other, and the third extending parts 58B and 68B are located to be parallel to each other.

According to this configuration, when the two holding mechanisms 54B and 64B hold one inner box B2, the two gripping mechanisms 52B and 62B are aligned in the direction (the third directions Y1 and Y2) orthogonal to the aligned direction of the two holding mechanisms 54B and 64B (the first directions X1 and X2). Therefore, when the holding mechanisms 54B and 64B hold the inner box B2, the gripping mechanisms 52B and 62B can be positioned between the two holding mechanisms 54B and 64B. Accordingly, when the holding mechanisms 54B and 64B hold the inner box B2, areas of the gripping mechanisms 52B and 62B outward of the upper surface of the inner box B2 in the plan view, can be reduced (in this embodiment, reduced to zero). Thus, in the accommodating operation of the inner box B2 into the large box B1, the gripping mechanisms 52B and 62B can be prevented from interfering with the large box B1, etc.

Note that, as illustrated in FIGS. 11 and 15, the holding mechanisms 54B and 64B according to this embodiment are provided with guiding members 59 and 69, respectively, which regulate relative positions between the inner box B2 and the holding parts 55B and 65B in the horizontal direction (the first directions X1 and X2, and the third directions Y1 and Y2) when the holding parts 55B and 65B hold the inner box B2. Note that in FIGS. 12 to 14 the illustration of the guiding members 59 and 69 is omitted. Each of the guiding members 59 and 69 is provided with a horizontal piece projecting from a base part of the holding mechanism 54B or 64B in the first direction X1 or X2, or in the third direction Y1 or Y2, and a vertical piece extending from a tip-end part of the horizontal piece in the second direction Z (downwardly). The holding parts 55B and 65B of the holding mechanisms 54B and 64B can hold the inner box B2 at a suitable position by the guiding members 59 and 69. Note that such guiding members 59 and 69 may also be provided to Embodiment 1.

Modifications

Although the embodiments according to the present disclosure are described above, the present disclosure is not limited to the above embodiments, and various improvements, changes, modifications are possible without departing from the purpose of the present disclosure.

For example, although in the above embodiment the two hands 5 and 6 are used to hold one inner box B2, one of the hands 5 and 6 may be used to hold one inner box B2. For example, by each of the two hands 5 and 6 holding one inner box B2, two inner boxes B2 may be accommodated in the large box B1 during one accommodating operation.

Figure 16:
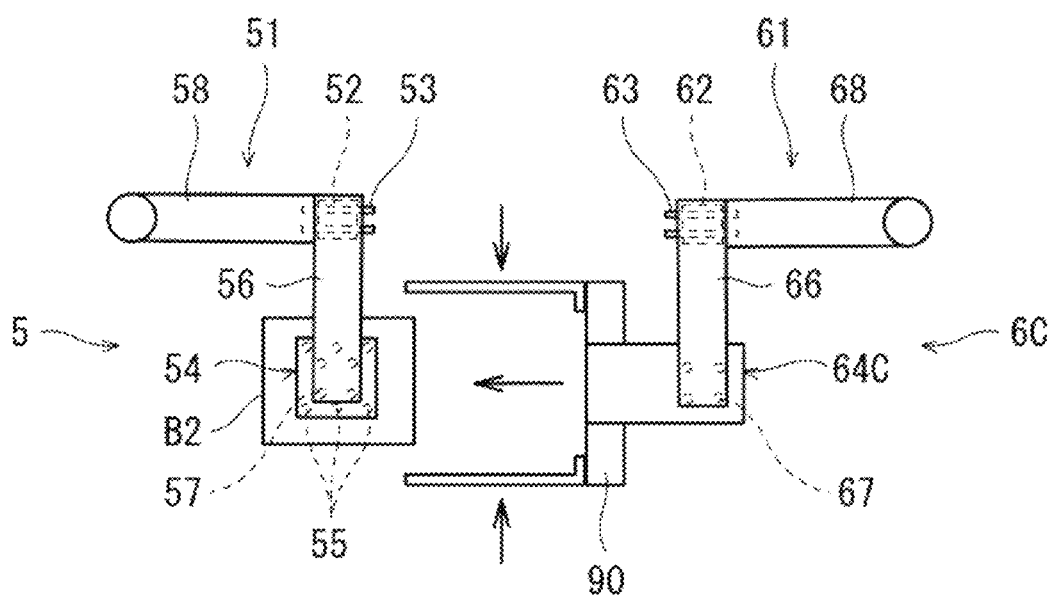
FIG. 16 is an enlarged plan view illustrating a first hand and a second hand in a modification of Embodiment 1.
Figure 16:

Moreover, the first hand and the second hand may have configurations different from each other. FIG. 16 is an enlarged plan view illustrating a first hand and a second hand in a modification of Embodiment 1. In the modification illustrated in FIG. 16, the first hand 5 has a configuration similar to Embodiment 1 described above. On the other hand, a second hand 6C is provided with the gripping mechanism 62 including the gripping part (first gripping part) 63 similar to Embodiment 1, and instead of the holding part 55, 65, 55B, or 65B having the suction structure of Embodiment 1 or 2, the second hand 6C is provided with a holding mechanism 64C including a second gripping part 90 which grips the inner box B2 from sides (the first direction X2). Also in this case, the controller 9 collaboratively controls the first arm 3 and the second arm 4 to perform the accommodating operation of the inner box B2 into the large box B1, while maintaining the holding state of the inner box B2 by the holding part 55 and the second gripping part 90.

Moreover, although in the above embodiment the two arms 3 and 4 are coaxially located on the rotation axis C, the two arms 3 and 4 may not be located coaxially. Moreover, the present disclosure is applicable to a box packing device which includes three or more arms, or a box packing device which includes only one arm.

In the embodiment described above, the box packing device 10 is provided with the robot 1 which is achieved by combining the operation in which the positions of the tip-end parts of the arms 3 and 4 do not change horizontally but change vertically, and the operation in which the tip-end parts of the arms 3 and 4 move in the plane parallel to the horizontal plane. However, the present disclosure is also applicable to a box packing device configured by a robot, such as a 6-axis articulated robot, including one or a plurality of arm(s) which can three-dimensionally control a position(s) of a tip-end part(s) of a hand(s). The box packing device including only one arm can realize the developing operation of the large box B1, for example, by the one arm and one hand connected thereto operating similarly to the second arms 5 and 5B and the second hands 6 and 6B according to the above embodiments, while the large-box setting device holding the large box B1 on the side surface to which the outer flap part B1R is connected.

The functionality of the elements disclosed herein and also the controller 9 may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, controller, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

It is apparent for a person skilled in the art from the above description that many improvements and other embodiments of the present disclosure are possible. Therefore, the above description is to be interpreted only as illustration, and it is provided in order to teach a person skilled in the art the best mode that implements the present disclosure. The details of the structures and/or the functions may be substantially changed, without departing from the spirit of the present disclosure. Additionally, features from one embodiment may be utilized with another embodiment in any desired manner.

According to a configuration, the one hand is provided with the gripping mechanism including the gripping part which grips the upper-end part of the flap part of the large box in order to develop the large box, and the holding mechanism including the holding part which holds the inner box. In addition, the gripping part is located to be separated from the holding part in the plan view and in the vertical direction. With this configuration, when the gripping part grips the upper-end part of the flap part of the large box in order to develop the large box, since the holding part is located at the position where the holding part does not overlap with the gripping part in the plan view, the holding mechanism can be prevented from interfering with the large box during the developing operation of the large box. Moreover, when the holding part moves into the large box (i.e., below a base part of the flap part) while the holding part holding the inner box, since the holding part is vertically separated from the gripping part, the gripping mechanism can be prevented from interfering with the large box during the accommodating operation of the inner box. Thus, works of developing the large box and placing therein the plurality of inner boxes can be efficiently performed by the sole device.

The hand base part may include a first extending part extending in a first direction, and a second extending part attached to a first end part of the first extending part and extending in a second direction orthogonal to the first direction. The gripping mechanism may be attached to a second end part of the first extending part so that the gripping part is oriented in the second direction. The holding mechanism may be attached to a tip-end part of the second extending part so that the holding part is oriented in the second direction.

According to this configuration, the gripping part is provided to the first extending part, and the holding part is provided to the second extending part. Thus, during one of the developing operation of the large box and the accommodating operation of the inner box, it is possible to prevent an unused mechanism from interfering with an ongoing operation by the simple configuration, without the gripping part or the holding part being moved so as to avoid the interference (i.e., without changing the relative positions of the gripping part with respect to the holding part).

In the first hand, the holding mechanism may be located outward of the large box when the gripping part of the gripping mechanism grips the upper-end part of the flap part of the large box. According to this configuration, the holding mechanism can be prevented from interfering with the large box during the developing operation of the large box.

The device may further include a second arm including a plurality of joint axes, and a second hand provided to a tip-end part of the second arm. The second hand may include a hand base part, a gripping mechanism provided to the hand base part and including a gripping part configured to grip an upper-end part of a flap part of the large box, and a holding mechanism provided to the hand base part and including a holding part configured to hold the inner box. According to this configuration, by the two arms collaboratively operating, the developing operation of the large box and the accommodation operation of the inner boxes can be performed more efficiently.

The first arm and the second arm may be coaxially disposed on an axis perpendicular to a pedestal and rotate about the axis independently from each other with respect to the pedestal. According to this configuration, since the two arms are coaxially disposed, a space efficiency and controllability improve.

Each of the hand base parts of the first and second hands may be provided with a first extending part extending in a first direction, and a second extending part attached to a first end part of the first extending part and extending in a second direction orthogonal to the first direction. The gripping mechanism of each of the first hand and the second hand may be attached to a second end part of the first extending part so that the gripping part is oriented in the second direction. The holding mechanism of each of the first hand and the second hand may be attached to a tip-end part of the second extending part so that the holding part is oriented in the second direction. The holding mechanisms of the first hand and the second hand may hold one inner box while the holding mechanisms are aligned in the first direction. The gripping mechanisms of the first hand and the second hand may be aligned in a third direction orthogonal to the first direction and the second direction while the holding mechanisms hold the one inner box.

According to this configuration, when the two holding mechanisms hold one inner box, the two gripping mechanisms are aligned in the direction orthogonal to the aligned direction of the two holding mechanisms. Therefore, when the holding mechanisms hold the inner box, the gripping mechanisms can be positioned between the two holding mechanisms. Accordingly, when the holding mechanisms hold the inner box, areas of the gripping mechanisms outward of the upper surface of the inner box in the plan view, can be reduced. Thus, in the accommodating operation of the inner box into the large box, the gripping mechanisms can be prevented from interfering with the large box, etc.

INDUSTRIAL APPLICABILITY

The present disclosure is useful for efficiently developing a large box and placing therein a plurality of inner boxes by a sole device.

DESCRIPTION OF REFERENCE CHARACTERS 10, 10B Box Packing Device
3, 3B First Arm
4, 4B Second Arm
5, 5B First Hand
6, 6B Second Hand
9 Controller
51, 51B, 61, 61B Hand Base Part or Hand Base
52, 52B, 62, 62B Gripping Mechanism
53, 53B, 63, 63B Gripping Part or Gripper
54, 54B, 64, 64B Holding Mechanism
55, 55B, 65, 65B Holding Part or Holder
56, 56B, 66, 66B First Extending Part or First Extension
56a, 66a First End Part or First End
56b, 66b Second End Part or Second End
57, 57B, 67, 67B Second Extending Part or Second Extension
B1 Large Box
B1R, B1L Outer Flap Part or Outer Flap
B2 Inner Box

What is claimed is:

1. A box packing device for placing, into a large box for packing, a plurality of inner boxes accommodating objects to be packed, respectively, comprising:
a first arm having a plurality of joint axes;
a first hand at a tip-end of the first arm; and
a controller configured to control operation of the first arm and the first hand,
wherein the first hand includes:
a hand base;
a gripping mechanism at the hand base and including a gripper to grip an upper-end of a flap of the large box; and
a holding mechanism at the hand base and including a holder to hold the inner box,
wherein the controller controls the operation of the first arm and the first hand so as to perform:
a developing operation in which the gripper of the gripping mechanism moves in a horizontal plane so as to develop the large box while the gripper grips the upper-end of the flap of the large box in a folded state; and
an accommodating operation in which the holder of the holding mechanism accommodates the inner box into the developed large box while the holder holds the inner box,
wherein the gripper of the gripping mechanism and the holder of the holding mechanism are located to be separated from each other in a plan view, and separated from each other in a vertical direction, and
wherein the controller controls the first hand such that when the holder holds the inner box, and the first hand places the held inner box onto a bottom surface of the developed large box in a state where the inner box is in contact with an inner surface of a side surface of the large box, the gripper is located outward of the side surface of the large box and higher than an upper end of the side surface.

2. The device of claim 1, wherein the hand base includes a first extension extending in a first direction, and a second extension attached to a first end of the first extension and extending in a second direction orthogonal to the first direction,
wherein the gripping mechanism is attached to a second end of the first extension so that the gripper is oriented in the second direction, and
wherein the holding mechanism is attached to a tip-end of the second extension so that the holder is oriented in the second direction.

3. The device of claim 1, wherein, in the first hand, the holding mechanism is located outward of the large box when the gripper of the gripping mechanism grips the upper-end of the flap of the large box.

4. The device of claim 1, further comprising:
a second arm including a plurality of joint axes; and
a second hand at a tip-end of the second arm,
wherein the second hand includes:
a hand base;
a gripping mechanism at the hand base and including a gripper to grip an upper-end of a flap of the large box; and
a holding mechanism at the hand base and including a holder to hold the inner box.

5. The device of claim 4, wherein the first arm and the second arm are coaxially disposed on an axis perpendicular to a pedestal and rotate about the axis independently from each other with respect to the pedestal.

6. The device of claim 4, wherein each of the hand bases of the first and second hands is provided with a first extension extending in a first direction, and a second extension attached to a first end of the first extension and extending in a second direction orthogonal to the first direction,
wherein the gripping mechanism of each of the first hand and the second hand is attached to a second end of the first extension so that the gripper is oriented in the second direction,
wherein the holding mechanism of each of the first hand and the second hand is attached to a tip-end of the second extension so that the holder is oriented in the second direction,
wherein the holding mechanisms of the first hand and the second hand hold one inner box while the holding mechanisms are aligned in the first direction, and
wherein the gripping mechanisms of the first hand and the second hand are aligned in a third direction orthogonal to the first direction and the second direction while the holding mechanisms hold the one inner box.

7. A box packing device for placing, into a large box for packing, a plurality of inner boxes accommodating objects to be packed, respectively, comprising:
a first arm having a plurality of joint axes;
a first hand at a tip-end of the first arm; and
means for controlling operation of the first arm and the first hand,
wherein the first hand includes:
a hand base;
a gripping mechanism at the hand base and including a gripper to grip an upper-end of a flap of the large box; and
a holding mechanism at the hand base and including a holder to hold the inner box,
wherein the means for controlling includes:
means for controlling a developing operation in which the gripper of the gripping mechanism moves in a horizontal plane so as to develop the large box while the gripper grips the upper-end of the flap of the large box in a folded state; and means for controlling an accommodating operation in which the holder of the holding mechanism accommodates the inner box into the developed large box while the holder holds the inner box, and wherein the gripper of the gripping mechanism and the holder of the holding mechanism are located to be separated from each other in a plan view, and separated from each other in a vertical direction, and wherein the means for controlling controls the first hand such that when the holder holds the inner box, and the first hand places the held inner box onto a bottom surface of the developed large box in a state where the inner box is in contact with an inner surface of a side surface of the large box, the gripper is located outward of the side surface of the large box and higher than an upper end of the side surface.

8. The device of claim 7, wherein the hand base includes a first extension extending in a first direction, and a second extension attached to a first end of the first extension and extending in a second direction orthogonal to the first direction, wherein the gripping mechanism is attached to a second end of the first extension so that the gripper is oriented in the second direction, and wherein the holding mechanism is attached to a tip-end of the second extension so that the holder is oriented in the second direction.

9. The device of claim 7, wherein, in the first hand, the holding mechanism is located outward of the large box when the gripper of the gripping mechanism grips the upper-end of the flap of the large box.

10. The device of claim 7, further comprising:
a second arm including a plurality of joint axes; and
a second hand at a tip-end of the second arm,
wherein the second hand includes:
a hand base;
a gripping mechanism at the hand base and including a gripper to grip an upper-end of a flap of the large box; and
a holding mechanism at the hand base and including a holder to hold the inner box.

11. The device of claim 10, wherein the first arm and the second arm are coaxially disposed on an axis perpendicular to a pedestal and rotate about the axis independently from each other with respect to the pedestal.

12. The device of claim 10, wherein each of the hand bases of the first and second hands is provided with a first extension extending in a first direction, and a second extension attached to a first end of the first extension and extending in a second direction orthogonal to the first direction, wherein the gripping mechanism of each of the first hand and the second hand is attached to a second end of the first extension so that the gripper is oriented in the second direction, wherein the holding mechanism of each of the first hand and the second hand is attached to a tip-end of the second extension so that the holder is oriented in the second direction, wherein the holding mechanisms of the first hand and the second hand hold one inner box while the holding mechanisms are aligned in the first direction, and wherein the gripping mechanisms of the first hand and the second hand are aligned in a third direction orthogonal to the first direction and the second direction while the holding mechanisms hold the one inner box.

13. A box packing device for placing, into a large box for packing, a plurality of inner boxes accommodating objects to be packed, respectively, comprising:
a first arm having a plurality of joint axes;
a first hand at a tip-end of the first arm; and
a controller configured to control operation of the first arm and the first hand,
wherein the first hand includes:
a hand base;
a gripping mechanism at the hand base and including a gripper to grip an upper-end of a flap of the large box; and
a holding mechanism at the hand base and including a holder to hold the inner box,
wherein the controller controls the operation of the first arm and the first hand so as to perform:
a developing operation in which the gripper of the gripping mechanism moves in a horizontal plane so as to develop the large box while the gripper grips the upper-end of the flap of the large box in a folded state; and
an accommodating operation in which the holder of the holding mechanism accommodates the inner box into the developed large box while the holder holds the inner box, and
wherein the gripper of the gripping mechanism and the holder of the holding mechanism are located to be separated from each other in a plan view, and separated from each other in a vertical direction,
wherein the box packing device further comprises:
a second arm including a plurality of joint axes; and
a second hand at a tip-end of the second arm,
wherein the second hand includes:
a hand base;
a gripping mechanism at the hand base and including a gripper to grip an upper-end of a flap of the large box; and
a holding mechanism at the hand base and including a holder to hold the inner box,
wherein each of the hand bases of the first and second hands is provided with a first extension extending in a first direction, and a second extension attached to a first end of the first extension and extending in a second direction orthogonal to the first direction,
wherein the gripping mechanism of each of the first hand and the second hand is attached to a second end of the first extension so that the gripper is oriented in the second direction,
wherein the holding mechanism of each of the first hand and the second hand is attached to a tip-end of the second extension so that the holder is oriented in the second direction, wherein the holding mechanisms of the first hand and the second hand hold one inner box while the holding mechanisms are aligned in the first direction, and
wherein the gripping mechanisms of the first hand and the second hand are aligned in a third direction orthogonal to the first direction and the second direction while the holding mechanisms hold the one inner box.

* * * * *